US011900911B2

(12) United States Patent
Bastyr

(10) Patent No.: US 11,900,911 B2
(45) Date of Patent: Feb. 13, 2024

(54) OCCUPANT DETECTION AND IDENTIFICATION BASED AUDIO SYSTEM WITH MUSIC, NOISE CANCELLATION AND VEHICLE SOUND SYNTHESIS

(71) Applicant: Harman International Industries, Incorporated, Stamford, CT (US)

(72) Inventor: Kevin J. Bastyr, Franklin, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 17/723,770

(22) Filed: Apr. 19, 2022

(65) Prior Publication Data

US 2023/0335105 A1 Oct. 19, 2023

(51) Int. Cl.

| | |
|---|---|
| ***G10K 11/178*** | (2006.01) |
| ***H04S 7/00*** | (2006.01) |
| ***H04R 5/02*** | (2006.01) |
| ***H04S 1/00*** | (2006.01) |

(52) U.S. Cl.

CPC .. *G10K 11/17854* (2018.01); *G10K 11/17817* (2018.01); *G10K 11/17825* (2018.01); *G10K 11/17875* (2018.01); *H04R 5/02* (2013.01); *H04S 1/007* (2013.01); *H04S 7/303* (2013.01); *G10K 2210/1282* (2013.01); *G10K 2210/3026* (2013.01); *G10K 2210/3028* (2013.01); *G10K 2210/3044* (2013.01);

(Continued)

(58) Field of Classification Search

CPC ......... G10K 11/1781; G10K 11/17813; G10K 11/17815; G10K 11/17817; G10K 11/17825; G10K 11/17857; G10K 11/17879; G10K 11/17883; G10K 2210/12; G10K 2210/128; G10K 2210/1282; G10K 2210/3022; G10K 2210/3023; G10K 2210/30232; G10K 2210/30351; G10K 2210/3219; G10K 2210/3221

See application file for complete search history.

(56) References Cited

U.S. PATENT DOCUMENTS

| | | | | |
|---|---|---|---|---|
| 9,348,793 | B2 * | 5/2016 | Singer | H04R 1/1083 |
| 9,560,445 | B2 * | 1/2017 | Raghuvanshi | H04R 3/002 |
| 10,204,616 | B1 | 2/2019 | Malka et al. | |

(Continued)

FOREIGN PATENT DOCUMENTS

| | | | |
|---|---|---|---|
| JP | 04234096 | A | 8/1992 |
| WO | 2011109156 | A1 | 9/2011 |

(Continued)

OTHER PUBLICATIONS

Extended European Search Report of European application No. 23166290.9 dated Aug. 25, 2023, 4 pages.

*Primary Examiner* — Kile O Blair

(74) *Attorney, Agent, or Firm* — BROOKS KUSHMAN P.C.

(57) ABSTRACT

A vehicle audio system is provided with at least one loudspeaker to project sound within a room in response to receiving an audio signal. A controller is programmed to generate the audio signal based on at least one occupancy signal indicative of occupant presence and identification within the room, wherein the audio signal is indicative of at least one of anti-noise sound, synthesized engine noise (SEN), and music.

20 Claims, 7 Drawing Sheets

(52) U.S. Cl.
CPC ................ *G10K 2210/3046* (2013.01); *G10K 2210/3056* (2013.01); *H04R 2499/13* (2013.01); *H04S 2400/01* (2013.01)

(56) References Cited

U.S. PATENT DOCUMENTS

| | | | | |
|---|---|---|---|---|
| 10,425,734 | B2 | 9/2019 | Kano | |
| 11,049,489 | B2 * | 6/2021 | Jung | F02D 41/28 |
| 11,183,166 | B1 * | 11/2021 | Basu | G10K 11/17857 |
| 2014/0226831 | A1 | 8/2014 | Tzirkel-Hancock et al. | |
| 2015/0256928 | A1 | 9/2015 | Mizuno | |
| 2019/0088246 | A1 | 3/2019 | Siciak et al. | |
| 2020/0066246 | A1 | 2/2020 | Von Elling et al. | |
| 2021/0201885 | A1 | 7/2021 | Bastyr et al. | |
| 2021/0323562 | A1 | 10/2021 | You et al. | |

FOREIGN PATENT DOCUMENTS

| | | | |
|---|---|---|---|
| WO | 2016146740 | A1 | 9/2016 |
| WO | 2017157595 | A1 | 9/2017 |
| WO | 2022031279 | A1 | 2/2022 |

* cited by examiner

OCCUPANT DETECTION AND IDENTIFICATION BASED AUDIO SYSTEM WITH MUSIC, NOISE CANCELLATION AND VEHICLE SOUND SYNTHESIS

TECHNICAL FIELD

The present disclosure is directed to an audio system and, more particularly, to controlling an audio system that includes remote microphone locations based on vehicle occupancy.

BACKGROUND

Active Noise Cancellation (ANC) systems attenuate undesired noise using feedforward and/or feedback structures to adaptively remove undesired noise within a listening environment, such as within a vehicle cabin. ANC systems generally cancel or reduce unwanted noise by generating cancellation sound waves to destructively interfere with the unwanted audible noise. Destructive interference results when noise and "anti-noise," which is largely identical in magnitude but opposite in phase to the noise, reduce the sound pressure level (SPL) at a location. In a vehicle cabin listening environment, potential sources of undesired noise come from the engine, the exhaust system, the interaction between the vehicle's tires and a road surface on which the vehicle is traveling, and/or sound radiated by the vibration of other parts of the vehicle. Therefore, unwanted noise varies with the speed, road conditions, and operating states of the vehicle.

A Road Noise Cancellation (RNC) system is a specific ANC system implemented on a vehicle in order to minimize undesirable road noise inside the vehicle cabin. RNC systems use vibration sensors to sense road induced vibration generated from the tire and road interface that leads to unwanted audible road noise. This unwanted road noise inside the cabin is then cancelled, or reduced in level, by using loudspeakers to generate sound waves that are ideally opposite in phase and identical in magnitude to the noise to be reduced at one or more listeners' ears. Cancelling such road noise results in a more pleasurable ride for vehicle passengers, and it enables vehicle manufacturers to use lightweight materials, thereby decreasing energy consumption and reducing emissions.

An Engine Order Cancellation (EOC) system is a specific ANC system implemented on a vehicle in order to minimize undesirable engine noise inside the vehicle cabin. EOC systems use a non-acoustic sensor, such as an engine speed sensor, to generate a signal representative of the engine crankshaft rotational speed in revolutions-per-minute (RPM) as a reference. This reference signal is used to generate sound waves that are opposite in phase to the engine noise that is audible in the vehicle interior. Because EOC systems use a signal from an RPM sensor, they do not require vibration sensors.

RNC systems are typically designed to cancel broadband signals, while EOC systems are designed and optimized to cancel narrowband signals, such as individual engine orders. ANC systems within a vehicle may provide both RNC and EOC technologies. Such vehicle-based ANC systems are typically Least Mean Square (LMS) adaptive feed-forward systems that continuously adapt W-filters based on noise inputs (e.g., acceleration inputs from the vibration sensors in an RNC system) and signals of physical microphones located in various positions inside the vehicle's cabin. A feature of LMS-based feed-forward ANC systems and corresponding algorithms, such as the filtered-X LMS (FxLMS) algorithm, is the storage of the impulse response, or secondary path, between each physical microphone and each anti-noise loudspeaker in the system. The secondary path is the transfer function between an anti-noise generating loudspeaker and a physical microphone, essentially characterizing how an electrical anti-noise signal becomes sound that is radiated from the loudspeaker, travels through a vehicle cabin to a physical microphone, and becomes the microphone output signal.

A remote microphone technique, is a technique in which an ANC system estimates an error signal generated by an imaginary or remote microphone at a location where no real physical microphone is located, based on the error signals received from one or more real physical microphones. This remote microphone technique can improve noise cancellation at a listener's ears even when no physical microphone is actually located there.

A driver may expect to hear noise from the powertrain within a passenger compartment of the vehicle during certain driving modes or maneuvers. Such powertrain noise may be reduced or absent in new vehicle architectures such as electric vehicles. A synthesized engine noise (SEN) signal that aides the driving experience by providing audible feedback of the vehicle's driving dynamics (e.g., acceleration, cruising, deceleration, reverse, startup, shutdown), can be provided to the loudspeakers and projected as audio that is audible to occupants within the passenger compartment. This SEN combines with the actual engine and exhaust sound to produce the total engine sound heard by the driver and vehicle occupants. This total engine sound combines with other sounds in the passenger compartment such as music to form the audible sonic soundscape.

A music playback system incorporated in the vehicle consists of the head unit, amplifiers, equalization and loudspeakers. These loudspeakers and amplifiers are typically shared with the noise cancellation systems and SEN systems in the vehicle for cost reasons. The equalization of the music playback system is made more complex by the way the original two distinct channels (right and left) of the audio signal must become up to thirty-seven channels or more for a thirty-seven or more loudspeaker playback system in modern vehicles. The output from all of these loudspeakers is audible to occupants seated in every seat, and the goal of the equalization is to provide an immersive listening experience, which includes reproducing a stereophonic sound stage, accurately rendering sounds on the right, left, and center (and perhaps behind) each listener.

Self-driving and autonomous vehicles allow for additional vehicle occupancy configurations. For example, a driver or operator of an autonomous vehicle may sit anywhere in the vehicle. Further, the operator may sit facing rearward or toward the side or center of the vehicle. Such occupancy configurations present new challenges for existing vehicle audio systems and noise cancelling systems that prioritize sound performance for an occupant of the front driver's seat who is facing forward in the vehicle.

SUMMARY

In one embodiment a vehicle audio system is provided with at least one loudspeaker to project sound within a room in response to receiving an audio signal. A controller is programmed to generate the audio signal based on at least one occupancy signal indicative of occupant presence and identification within the room, wherein the audio signal is indicative of at least one of anti-noise sound, synthesized engine noise (SEN), and music.

In another embodiment a method is provided for controlling an audio system. An audio signal to be radiated from a loudspeaker within a vehicle is generated based on at least one occupancy signal indicative of occupant presence and identification within the vehicle, wherein the audio signal is indicative of at least one of anti-noise sound, synthesized engine noise (SEN), and music.

In yet another embodiment, a vehicle audio system is provided with at least one loudspeaker to project sound within a room in response to receiving an audio signal. At least one occupancy sensor provides an occupancy signal indicative of occupant presence and occupant identification. A controller is programmed to generate the audio signal based on the occupancy signal, wherein the audio signal is indicative of at least one of anti-noise sound, synthesized engine noise (SEN), and music.

DETAILED DESCRIPTION

Figure 1:
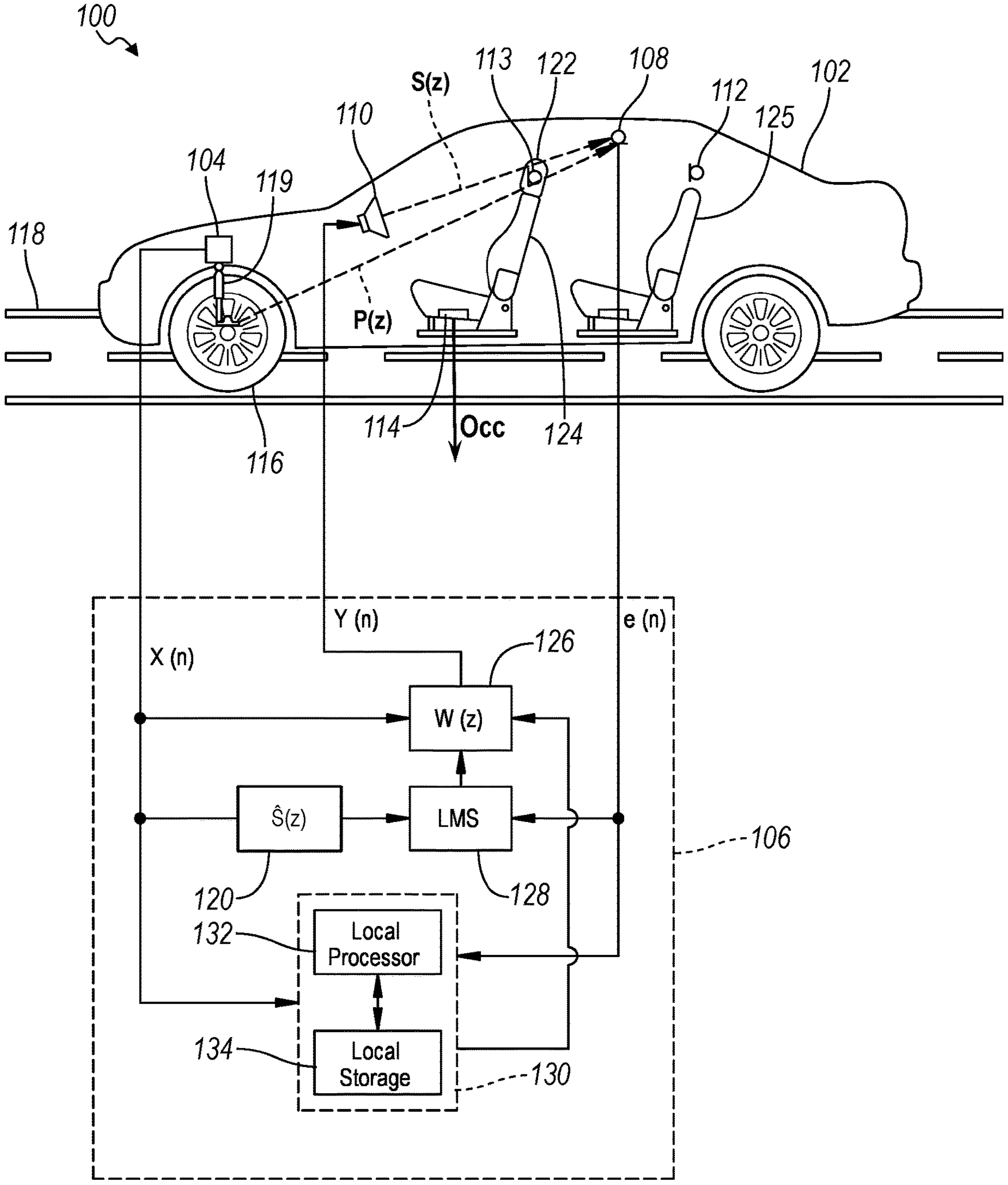
FIG. 1 is a schematic diagram of a vehicle having an active noise cancellation (ANC) system including a road noise cancellation (RNC), a remote microphone, and an occupancy detector, in accordance with one or more embodiments.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis.

With self-driving and autonomous vehicles of the near future there is simply no telling where the owner of the vehicle will be sitting within the vehicle. In autonomous vehicles of the future, there is no guarantee that any of the front seats will be occupied. There is also no guarantee that any or all of the seats will even be facing forward. This will certainly be problematic for the current day's audio strategies within the passenger cabin. While audio system and noise cancelling system performance is often stated to be balanced for all four (or more) passenger positions, in nearly all systems, performance in the front row is superior. In systems dating back to 2008 or earlier, certain vehicle's audio systems had a driver mode, where the audio system performance was optimized for the driver seat location at total and complete expense of performance in all of the other seats. How can the optimal audio experience be delivered to the most important person, which in most cases is the owner or most frequent user of a vehicle?

Using a variety of methods including sensors, sensory arrays, sensor fusion, speech recognition, and loudspeaker recognition, the system can detect which seats or locations in the vehicle are occupied, and who is occupying the seats. Further, the system will detect where the owner of the vehicle is sitting and their instantaneous location—which may change while the vehicle is in motion. The system can then deliver the optimal music audio playback performance, noise cancellation performance, synthetic engine noise system performance, and optimal speech clarity and privacy for Bluetooth connected telephone communication. Optimal performance can be obtained by selecting the optimal tuning that uses a combination of the optimal microphones, optimal loudspeakers for a given constellation of passengers, or for a given location of the vehicle owner.

The simplest methods of determining which seats are occupied involve using either seat belt sensor data, or using the existing seat occupancy sensor for the airbag system. Naturally, these occupancy sensors can be deployed in all of the seats. Less expensive sensors are also possible, for example, ultrasonic proximity sensors, facial recognition or IR imagers, PIR sensors, or any other in-seat weight (load cells) or motion are all possible. Certain cellphone handsets have included "presence sensors" that use inexpensive IR or near-IR sensors to detect the heat signature of a person, and this same type of inexpensive sensor may be used here as well. In the last few years, driver monitoring systems (DMS) are being deployed for safety reasons, and Occupant Monitoring Systems (OMS) are being considered for a wider range of vehicle price points. Harman's development projects may bring some advances in DMS/OMS technologies to vehicles with Harman audio and noise cancellation systems, and can be leveraged for occupant position monitoring and identification.

Determining the identity of the individuals in those locations can also be approached in several ways. One involving neural networks in various ways is determining identity via speech or loudspeaker recognition. Speech recognition technology of the "always-on, always-listening" variety has been built into cellphone handsets for more than 5 years now in the Android operating system. One type of deep learning pioneered by Alex Graves is the creation of a speech recognition systems employing long short-term memory (LSTM) neural networks using a method called connectionist temporal classification (CTC). The cloud-based google speech to text algorithm employs CTC-trained LSTM's to obtain their industry leading accuracy. These systems are often activated by a trained loudspeaker recognition algorithm that enables an algorithm to recognize not only what words are being spoken, but WHO is speaking based on formant analysis of a key "trigger" word. Text independent loudspeaker recognition, those systems that don't require a "trigger" word, also exist. They are a more complicated pattern recognition problem, and so they involve the processing and storage of loudspeaker data using Gaussian mixture models, hidden Markov models, or neural networks, etc.

Other methods to determine the identity of the vehicle owner includes determining the location of the vehicle's key within the cabin—who's pocket it is in, or which seat is the purse or bag next to. Other methods include using passenger facing cameras (DMS and OMS) and machine vision to identify the owner of the vehicle. Other methods can include the creation of a database of information about various vehicle occupants gathered when there is only one occupant. For example, the loudspeaker's voice data, facial image, 3D head scan, weight (using in-seat load cell), etc of a person can be tied to their name using the connection to the person's cellphone handset which will likely Bluetooth tether to the vehicle or be connected via Android Auto or Apple CarPlay. A database of all previous vehicle occupants will then be available to the system to determine which seats receive the optimal performance. For example, perfect music spatial imaging and frequency response, and enhanced engine orders may be less important to occupants who are less than 5 or 10 years old. Maximum RNC and EOC may be desired in the location of those occupants instead.

Once the occupied seats or regions of the vehicle have been identified, and the location of the vehicle owner has been identified, the system performance can be suitably optimized for the prioritized constellation of passengers. Because there is no need to provide good EOC/ESS/SEN/RNC/Audio (Engine Order Cancellation, Engine Sound Synthesis, Synthetic Engine Noise, Road Noise Cancellation) performance in unoccupied seats, the system should automatically select the error sensors, loudspeakers and tuning that will provide the optimal experience only in the occupied seats.

Active noise cancellation systems typically offer maximum noise cancellation at the location of the error sensor (often headliner mounted microphones). If only one error sensor is used in an active system, it is known that there will be a steep gradient of performance as one moves their ear away from the microphone, and it is likely that the sound pressure level in all other locations of the vehicle will increase. To avoid this "noise boosting" at the location of listeners, 4, 6 or 8 microphones are used as error sensors so that the active system reduces the noise field more uniformly in the cabin; however, the best noise cancellation is in the vicinity of each of the microphones which are ideally located near the occupied seats.

In an embodiment, many microphones are installed in the headliner, and those that are located near the occupant's heads are selected. For example, if no rear seat passengers are present, no headliner microphones above the rear seat are used by the algorithm. Instead, additional microphones above the front seat passengers are selected by the algorithm. This will result in error sensors sampling the acoustic field, and providing the best acoustic noise cancellation at the occupied, or prioritized seats. In addition, loudspeakers that are too distant, and have too long a propagation delay to the passengers can be disabled for RNC systems, as they cannot adequately cancel unwanted noise in the occupied, prioritized seats. Similarly, any reference transducers that do not provide a beneficial performance impact in the occupied seats can be disabled.

In this embodiment, it is not only transducer selection that will change based on seat occupancy. Because the rear seat is empty, then the EOC or ESS performance only needs to be optimized in the front seat. This greatly simplifies the engineering challenge of tuning the vehicle, as the rear seat performance can be ignored. Lifting the constraint of "acceptable rear seat noise performance" will result in a tuning that will provide a quieter (RNC and EOC) experience for the front seat passengers. Note that these examples use terms such as "front seat" and "rear seat" though other seating configurations are possible, such as "left side" and "right side" or "seat 1" and "seat 6."

In another embodiment, a small group of microphones may have their output signals combined to form a microphone array. If these microphones are deployed with and X, Y and Z spatial separation from a central microphone, a directional bean can be formed that can aim in any direction. An adaptive beamformer can then be made by changing the delay-and-sum adaptive beamformer properties in ways known to those skilled in the art. The direction of the microphone beam can then be steered depending on the vehicle owner's location in order to best transmit his voice via Bluetooth or in car communication system. Typical approaches to noise reduction known to those in telecommunications requires two signals, including the aforementioned voice signal, and an additional, primarily noise signal, which can also be formed by the adaptive beamformer, but is oriented at the dominant noise source. Spectral subtraction or other methods are typically used to remove much of the noise signal from the voice signal, producing a voice signal with even lower noise.

In another embodiment, when only a rear seat is occupied by the autonomous vehicle's "driver", four or eight microphones above and closely adjacent to the "driver's" head, can be selected for RNC and EOC. The individual loudspeaker's frequency response and phase/delay can be augmented such that the "image source" location of the ESS sounds can be optimal for the sole rear seat occupant: "the driver". Woofers mounted on the right side of the car have an asymmetric transfer function between the right and left seats, meaning that occupants on the right and left side of the vehicle would need different EQ's applied to this one loudspeaker for optimal system performance. With only a sole occupant, the optimal magnitude and phase EQ for the sole occupant can be used.

In one or more embodiments, music playback frequency response and sound stage imaging performance can be optimized only for seats that are occupied. The seats can be further prioritized based on aforementioned occupant identification schemes.

With reference to FIG. 1, a road noise cancellation (RNC) system is illustrated in accordance with one or more embodiments and generally represented by numeral 100. The RNC system 100 is depicted within a vehicle 102 having one or more vibration sensors 104. The vibration sensors 104 are disposed throughout the vehicle 102 to monitor the vibratory behavior of the vehicle's suspension, subframe, as well as other axle and chassis components. The RNC system 100 may be integrated with a broadband adaptive feed-forward active noise cancellation (ANC) system 106 that generates anti-noise by adaptively filtering the signals from the vibration sensors 104 using one or more physical microphones 108. The anti-noise signal may then be played through one or more loudspeakers 110 to become sound. S(z) represents a transfer function between a single loudspeaker 110 and a single microphone 108.

While FIG. 1 shows a single vibration sensor 104, microphone 108, and loudspeaker 110 for simplicity purposes only, it should be noted that typical RNC systems use multiple vibration sensors 104 (e.g., ten or more), microphones 108 (e.g., four to six), and loudspeakers 110 (e.g., four to eight). The ANC system 106 may also include one or more remote microphones 112, 113 and one or more occupancy detectors 114 that are used for adapting anti-noise signal(s) that are optimized for the occupants in the vehicle 102, according to one or more embodiments.

The vibration sensors 104 may include, but are not limited to, accelerometers, force gauges, geophones, linear variable differential transformers, strain gauges, and load cells. Accelerometers, for example, are devices whose output signal amplitude is proportional to acceleration. A wide variety of accelerometers are available for use in RNC systems. These include accelerometers that are sensitive to vibration in one, two and three typically orthogonal directions. These multi-axis accelerometers typically have a separate electrical output (or channel) for vibration sensed in their X-direction, Y-direction and Z-direction. Single-axis and multi-axis accelerometers, therefore, may be used as vibration sensors 104 to detect the magnitude and phase of acceleration and may also be used to sense orientation, motion, and vibration.

Noise and vibration that originates from a wheel 116 moving on a road surface 118 may be sensed by one or more of the vibration sensors 104 mechanically coupled to a suspension device 119 or a chassis component of the vehicle 102. The vibration sensor 104 may output a noise signal X(n), which is a vibration signal that represents the detected road-induced vibration. It should be noted that multiple vibration sensors are possible, and their signals may be used separately, or may be combined. In certain embodiments, a microphone may be used in place of a vibration sensor to output the noise signal X(n) indicative of noise generated from the interaction of the wheel 116 and the road surface 118. The noise signal X(n) may be filtered with a modeled transfer characteristic $\hat{S}(z)$, which estimates the secondary path (i.e., the transfer function between an anti-noise loudspeaker 110 and a physical microphone 108), by a secondary path filter 120.

Road noise that originates from the interaction of the wheel 116 and the road surface 118 is also transferred, mechanically and/or acoustically, into the passenger cabin and is received by the one or more microphones 108 inside the vehicle 102. The one or more microphones 108 may, for example, be located in a headliner of the vehicle 102, or in some other suitable location to sense the acoustic noise field heard by occupants inside the vehicle 102, such as an occupant sitting on a rear seat 125. The road noise originating from the interaction of the road surface 118 and the wheel 116 is transferred to the microphone 108 according to a transfer characteristic P(z), which represents the primary path (i.e., the transfer function between an actual noise source and a physical microphone).

The microphone 108 may output an error signal e(n) representing the sound present in the cabin of the vehicle 102 as detected by the microphone 108, including noise and anti-noise. In the RNC system 100, an adaptive transfer characteristic W(z) of a controllable filter 126 may be controlled by adaptive filter controller 128, which may operate according to a known least mean square (LMS) algorithm based on the error signal e(n) and the noise signal X(n) filtered with the modeled transfer characteristic S(z) by the secondary path filter 120. The controllable filter 126 is often referred to as a W-filter. An anti-noise signal Y(n) may be generated by the controllable filter or filters 126 and the vibration signal, or a combination of vibration signals X(n). The anti-noise signal Y(n) ideally has a waveform such that when played through the loudspeaker 110, anti-noise is generated near the occupants' ears and the microphone 108 that is substantially opposite in phase and identical in magnitude to that of the road noise audible to the occupants of the vehicle cabin. The anti-noise from the loudspeaker 110 may combine with road noise in the vehicle cabin near the microphone 108 resulting in a reduction of road noise-induced sound pressure levels (SPL) at this location. In certain embodiments, the RNC system 100 may receive sensor signals from other acoustic sensors in the passenger cabin, such as an acoustic energy sensor, an acoustic intensity sensor, or an acoustic particle velocity or acceleration sensor to generate error signal e(n).

While the vehicle 102 is under operation, at least one controller 130 (hereafter "the controller 130") may collect and process the data from the vibration sensors 104 and the microphones 108. The controller 130 includes a processor 132 and storage 134. The processor 132 collects and processes the data to construct a database containing data and/or parameters to be used by the vehicle 102. Examples of the types of data related to the RNC system 100 that may be useful to store locally at the storage 134 include, but are not limited to, occupancy configuration data related to: secondary paths to virtual and physical microphone locations, the transfer function between the physical and remote microphone location H(z), preferred physical microphone sets, and preferred loudspeaker sets, sets of loudspeaker equalization curves for different seating configurations.

Although the controller 130 is shown as a single controller, it may contain multiple controllers, or it may be embodied as software code within one or more other controllers, such as the adaptive filter controller 128. The controller 130 generally includes any number of microprocessors, ASICs, ICs, memory (e.g., FLASH, ROM, RAM, EPROM and/or EEPROM) and software code to co-act with one another to perform a series of operations. Such hardware and/or software may be grouped together in modules to perform certain functions. Any one or more of the controllers or devices described herein include computer executable instructions that may be compiled or interpreted from computer programs created using a variety of programming languages and/or technologies. In general, a processor, e.g., the processor 132 receives instructions, for example from a memory, e.g., the storage 134, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. The controller 130 also includes predetermined data, or "look up tables" that are stored within the memory, according to one or more embodiments.

As previously described, typical RNC systems may use several vibration sensors, microphones and loudspeakers to sense structure-borne vibratory behavior of a vehicle and generate anti-noise. The vibration sensors may be multi-axis accelerometers having multiple output channels. For instance, triaxial accelerometers typically have a separate electrical output for vibrations sensed in their X-direction, Y-direction, and Z-direction. A typical configuration for an RNC system may have, for example, six error microphones, six loudspeakers, and twelve channels of acceleration signals coming from four triaxial accelerometers or six dual-axis accelerometers. Therefore, the RNC system will also include multiple S(z) filters (e.g., secondary path filters 120) and multiple W(z) filters (e.g., controllable filters 126).

The simplified RNC system schematic depicted in FIG. 1 shows one secondary path, represented by S(z), between the loudspeaker 110 and the microphone 108. As previously mentioned, RNC systems typically have multiple loudspeakers, microphones and vibration sensors. Accordingly, a six-speaker, six-microphone RNC system will have thirty-six total secondary paths (i.e., 6×6). Correspondingly, the six-speaker, six-microphone RNC system may likewise have thirty-six $\hat{S}(z)$ filters (i.e., secondary path filters 120), which estimate the transfer function for each secondary path. As shown in FIG. 1, an RNC system will also have one W(z) filter (i.e., controllable filter 126) between each noise signal X(n) from a vibration sensor (i.e., accelerometer) 104 and each loudspeaker 110. Accordingly, a twelve-accelerometer signal, six-speaker RNC system may have seventy-two W(z) filters. The relationship between the number of accelerometer signals, loudspeakers, and W(z) filters is illustrated in FIG. 2.

Figure 2:
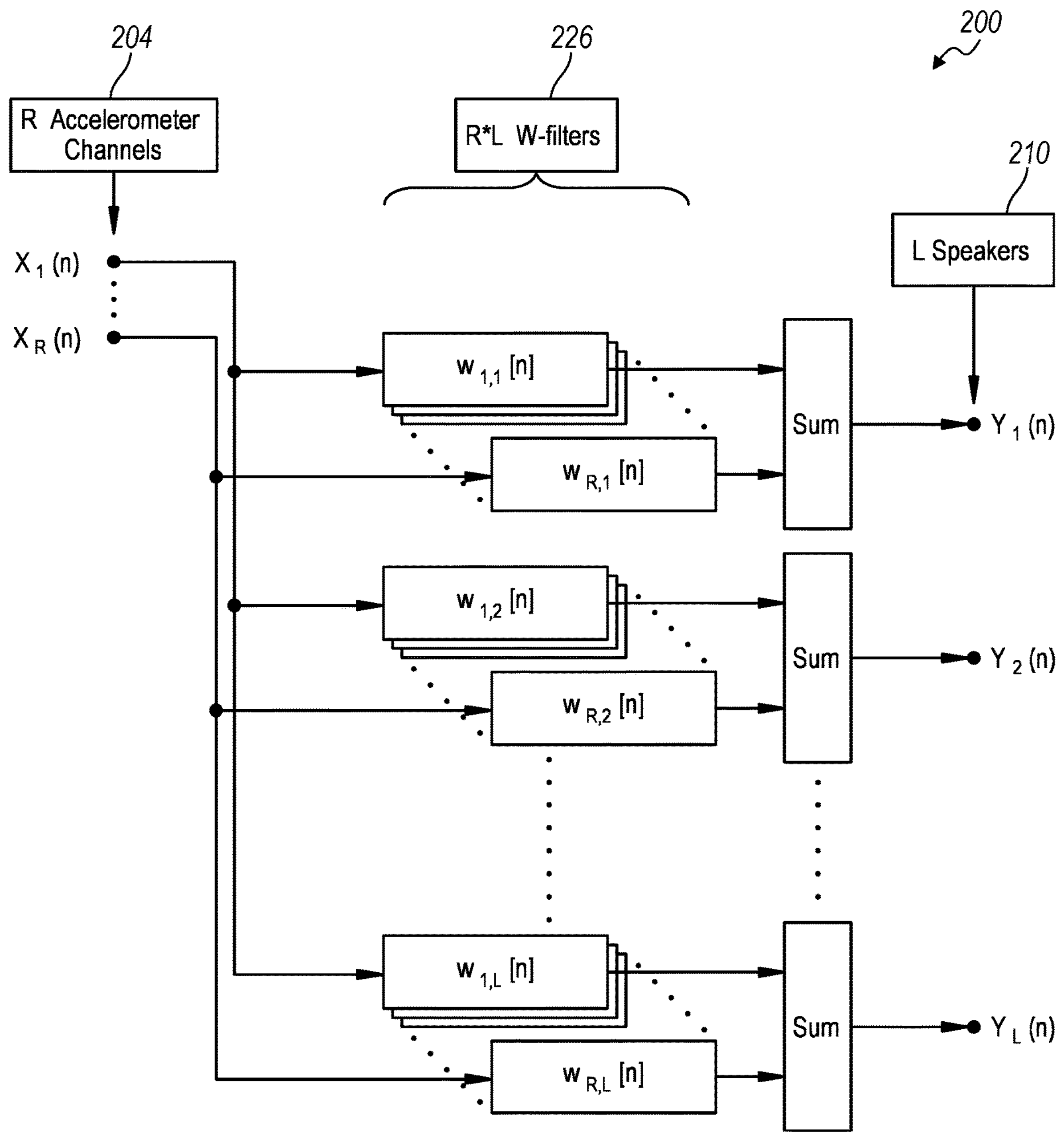
FIG. 2 is a sample schematic diagram demonstrating relevant portions of an RNC system scaled to include R accelerometer signals and L loudspeaker signals.

FIG. 2 is a sample schematic diagram demonstrating relevant portions of an RNC system 200 scaled to include R accelerometer signals [$X_1(n)$, $X_2(n)$, . . . $X_R(n)$] from accelerometers 204 and L loudspeaker signals [$Y_1(n)$, $Y_2(n)$, . . . $Y_L(n)$] from loudspeakers 210. Accordingly, the RNC system 200 may include R*L controllable filters (or W-filters) 226 between each of the accelerometer signals and each of the loudspeakers. As an example, an RNC system having twelve accelerometer outputs (i.e., R=12) may employ six dual-axis accelerometers or four triaxial accelerometers. In the same example, a vehicle having six loudspeakers (i.e., L=6) for reproducing anti-noise, therefore, may use seventy-two W-filters in total. At each of the L loudspeakers, R W-filter outputs are summed to produce the loudspeaker's anti-noise signal Y(n). Each of the L loudspeakers may include an amplifier (not shown). In one or more embodiments, the R accelerometer signals filtered by the R W-filters are summed to create an electrical anti-noise signal y(n), which is fed to the amplifier to generate an amplified anti-noise signal Y(n) that is sent to a loudspeaker.

The ANC system 106 illustrated in FIG. 1 may also include an engine order cancellation (EOC) system. As mentioned above, EOC technology uses a non-acoustic signal such as an engine speed signal representative of the engine crankshaft rotational speed as a reference in order to generate sound that is opposite in phase to the engine noise audible in the vehicle interior. EOC systems may utilize a narrowband feed-forward ANC framework to generate anti-noise using an engine speed signal to guide the generation of an engine order signal identical in frequency to the engine order to be cancelled, and adaptively filtering it to create an anti-noise signal. After being transmitted via a secondary path from an anti-noise source to a listening position or physical microphone, the anti-noise ideally has the same amplitude, but opposite phase, as the combined sound generated by the engine and exhaust pipes after being filtered by the primary paths that extend from the engine to the listening position and from the exhaust pipe outlet to the listening position or physical or remote microphone position. Thus, at the place where a physical microphone resides in the vehicle cabin (i.e., most likely at or close to the listening position), the superposition of engine order noise and anti-noise would ideally become zero so that acoustic error signal received by the physical microphone would only record sound other than the (ideally cancelled) engine order or orders generated by the engine and exhaust.

Commonly, a non-acoustic sensor, for example an engine speed sensor, is used as a reference. Engine speed sensors may be, for example, Hall Effect sensors which are placed adjacent to a spinning steel disk. Other detection principles can be employed, such as optical sensors or inductive sensors. The signal from the engine speed sensor can be used as a guiding signal for generating an arbitrary number of reference engine order signals corresponding to each of the engine orders. The reference engine orders form the basis for noise cancelling signals generated by the one or more narrowband adaptive feed-forward LMS blocks that form the EOC system.

Figure 3:
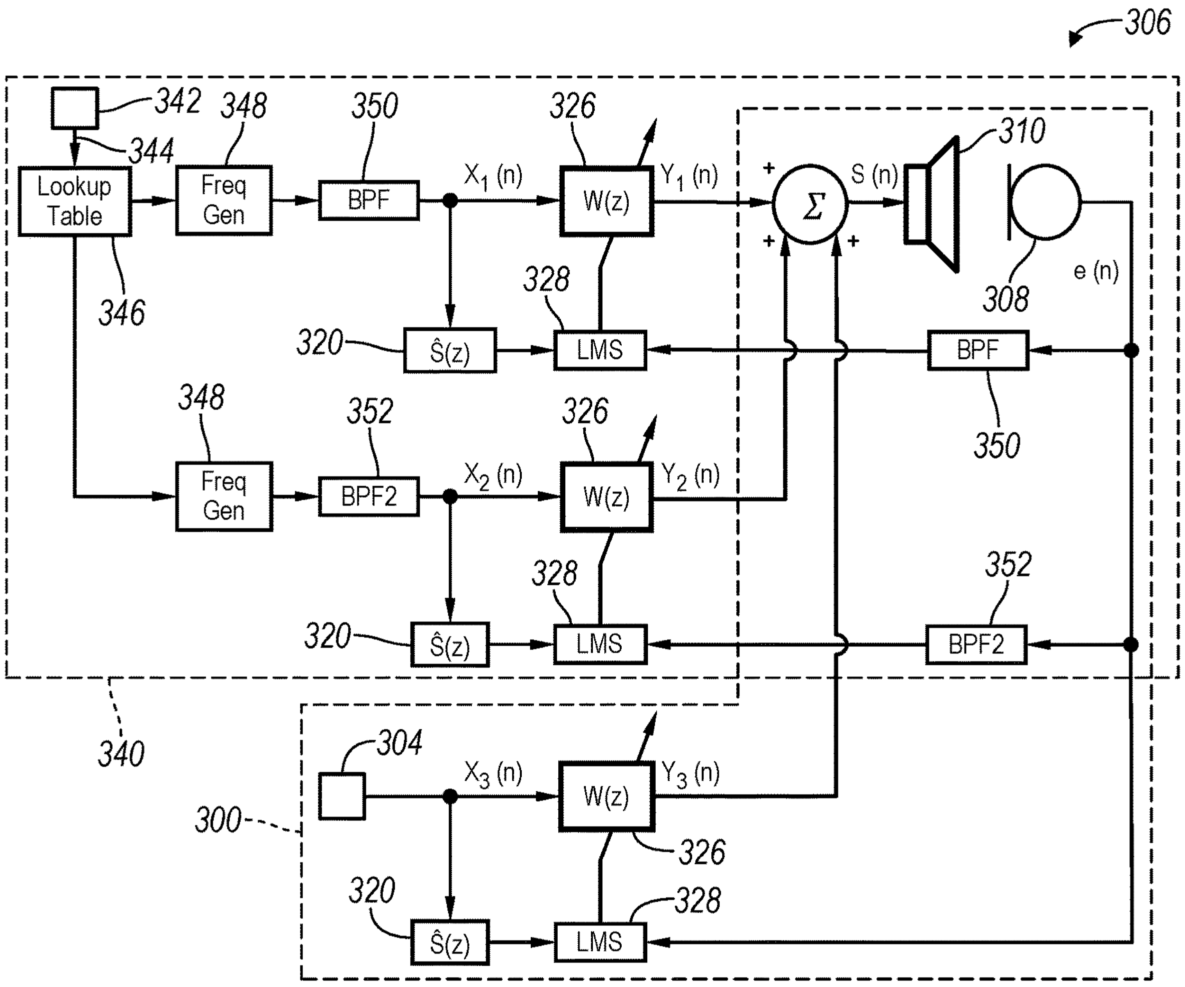
FIG. 3 is a sample schematic block diagram of an ANC system including an engine order cancellation (EOC) system and an RNC system.

FIG. 3 is a schematic block diagram illustrating an example of an ANC system 306, including both an RNC system 300 and an EOC system 340. Similar to RNC system 100, the RNC system 300 may include a vibration sensor 304, a physical microphone 308, a loudspeaker 310, a secondary path filter 320, a w-filter 326, and an adaptive filter controller 328 consistent with operation of the vibration sensor 104, the physical microphone 108, the loudspeaker 110, the secondary path filter 120, the w-filter 126, and the adaptive filter controller 128, respectively, discussed above.

The EOC system 340 may include an engine speed sensor 342 to provide an engine speed signal 344 (e.g., a square-wave signal) indicative of rotation of an engine crank shaft or other rotating shaft such as the drive shaft, half shafts or other shafts whose rotational rate is aligned with vibrations coupled to vehicle components that lead to noise in the passenger cabin. In some embodiments, the engine speed signal 344 may be obtained from a vehicle network bus (not shown). As the radiated engine orders are directly proportional to the crank shaft RPM, the engine speed signal 344 is representative of the frequencies produced by the engine and exhaust system. Thus, the signal from the engine speed sensor 342 may be used to generate reference engine order signals corresponding to each of the engine orders for the vehicle. Accordingly, the engine speed signal 344 may be used in conjunction with a lookup table 346 of Engine Speed (RPM) vs. Engine Order Frequency, which provides a list of engine orders radiated at each engine speed. The frequency generator 348 may take as an input the Engine Speed (RPM) and generate a sine wave for each order based on this lookup table 346.

The frequency of a given engine order at the sensed Engine Speed (RPM), as retrieved from the lookup table 346, may be supplied to a frequency generator 348, thereby generating a sine wave at the given frequency. This sine wave represents a noise signal X(n) indicative of engine order noise for a given engine order. Similar to the RNC system 300, this noise signal X(n) from the frequency generator 348 may be sent to an adaptive controllable filter 326, or W-filter, which provides a corresponding anti-noise signal Y(n) to the loudspeaker 310. As shown, various components of this narrow-band, EOC system 340 may be identical to the broadband RNC system 300, including the physical microphone 308, adaptive filter controller 328 and secondary path filter 320. The anti-noise signal Y(n), broadcast by the loudspeaker 310 generates anti-noise that is substantially out of phase but identical in magnitude to the actual engine order noise at the location of a listener's ear, which may be in close proximity to a physical microphone 308, thereby reducing the sound amplitude of the engine order. Because engine order noise is narrow band, the error signal e(n) may be filtered by a bandpass filter 350 prior to passing into the LMS-based adaptive filter controller 328. In an embodiment, proper operation of the LMS adaptive filter controller 328 is achieved when the noise signal X(n) output by the frequency generator 348 is bandpass filtered using the same bandpass filter parameters.

In order to simultaneously reduce the amplitude of multiple engine orders, the EOC system 340 may include multiple frequency generators 348 for generating a noise signal X(n) for each engine order based on the Engine Speed (RPM) signal 344. As an example, FIG. 3 shows a two order EOC system having two such frequency generators for generating a unique noise signal (e.g., $X_1(n)$, $X_2(n)$, etc.) for each engine order based on engine speed. Because the frequency of the two engine orders differ, the bandpass filters 350, 352 (labeled BPF and BPF2) have different high- and low-pass filter corner frequencies. The number of frequency generators and corresponding noise-cancellation components will vary based on the number of engine orders to be cancelled for a particular engine of the vehicle. As the two-order EOC system 340 is combined with the RNC system 300 to form the ANC system 306, the anti-noise signals Y(n) output from the three controllable filters 326 are summed and sent to the loudspeaker 310 as a loudspeaker signal S(n). Similarly, the error signal e(n) from the physical microphone 308 may be sent to the three LMS adaptive filter controllers 328.

ANC systems generate anti-noise that is ideally opposite in phase and identical in magnitude to the noise to be reduced at one or more listeners' ears. Existing ANC systems often generate a zone of reduced noise ("quiet zone") that is centered around the physical microphone position(s). The size of the quiet zone is approximately one tenth of an acoustic wavelength, resulting in a small quiet zone that decreases in size for increasing frequency. If only one physical microphone is used for a vehicle application, then there will be a steep gradient of performance as one moves their ear away from the microphone, especially once the ear is greater than one-tenth of a wavelength away. Further, for a system including one physical microphone, it is likely that the sound pressure level in all other locations of the vehicle will increase. To avoid this "noise boosting" at the location of a first or second vehicle occupant, four or six physical microphones may be used so that the active system reduces the noise field in more locations in the vehicle, such that the noise cancellation is more uniform throughout the cabin. In order to obtain the maximum perceived noise cancellation, the physical microphones would ideally be mounted at the occupants' ear locations. However, in many practical cases, the physical microphones cannot be placed close to all vehicle passenger's ears. This is due to vehicle packaging limitations, such as convertible tops, sunroofs, and the absence of seat mounted microphones, all of which may make it difficult to achieve maximum noise field reduction where it matters the most, at the locations of the vehicle passenger's ears.

Referring back to FIG. 1, the vehicle 102 includes a physical microphone 108 that is located within a headliner. The physical microphone 108 is not located proximate to the ears of an occupant sitting on the rear seat 125. However, the ANC system 106 includes a remote microphone 112 that is located proximate to the ears of an occupant sitting on the rear seat 125.

A remote microphone technique is a technique in which an ANC system estimates an error signal generated by an imaginary or remote microphone at a location where no real physical microphone is located based on the error signals received from one or more real physical microphones. This remote microphone technique can improve noise cancellation at the locations of the passenger's ears even when no physical microphone is actually located there. An additional benefit is that this remote microphone technique provides a flexible solution of physical microphone mounting locations. Compared with the conventional, non-remote noise cancellation algorithm, the remote microphone algorithm utilizes an estimated remote signal as an error signal $e_v(n)$. Based on the remote error signal estimate, the remote microphone algorithm will adapt the W-filters based on the estimated remote error signal instead of the physical error signal. Hence, the noise cancellation system performance is maximized at the location of these remote microphones, which are ideally close to the actual positions of the listener's ears, rather than at the location of the physical microphones, which may be far from the listener's ears, e.g., on the vehicle headliner. A vehicle with a headrest mounted microphone may benefit from the remote microphone technique, because a remote microphone can be located closer to the occupant's ears than the headrest mounted microphone.

Figure 4A:
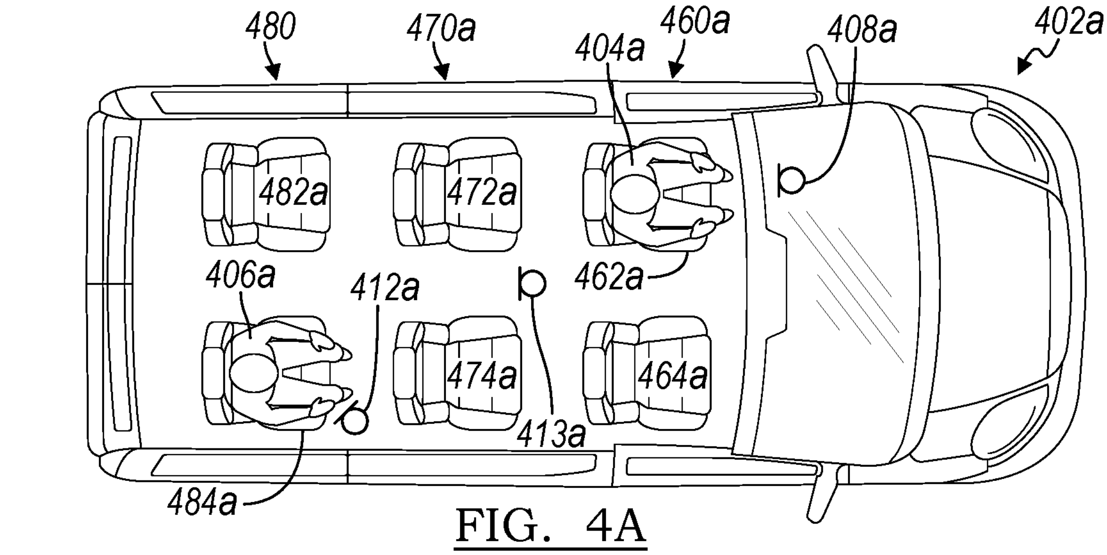
FIG. 4A is a top view of the vehicle of FIG. 1, illustrating a first vehicle occupancy configuration.
Figure 4B:
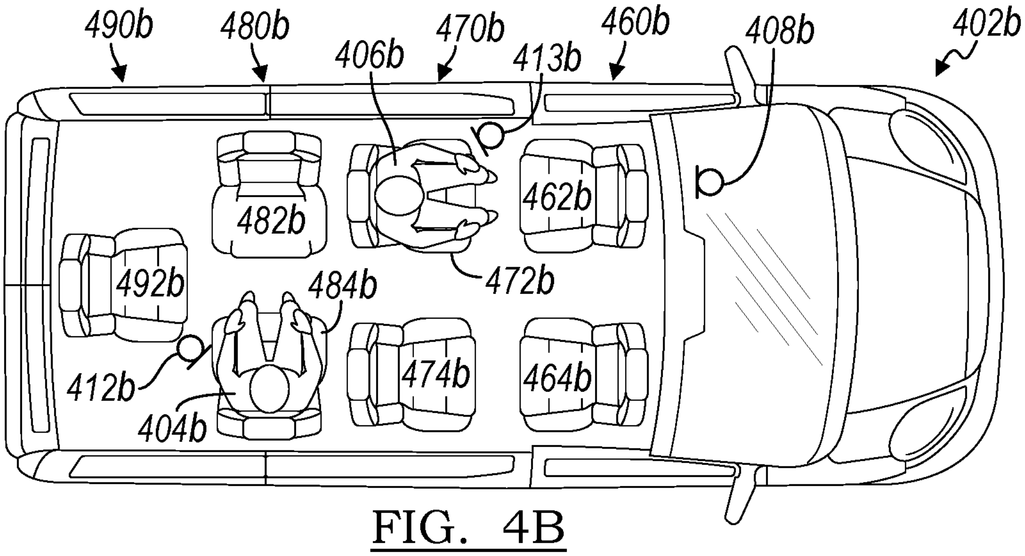
FIG. 4B is another top view of the vehicle of FIG. 1, illustrating a second vehicle occupancy configuration.
Figure 4C:
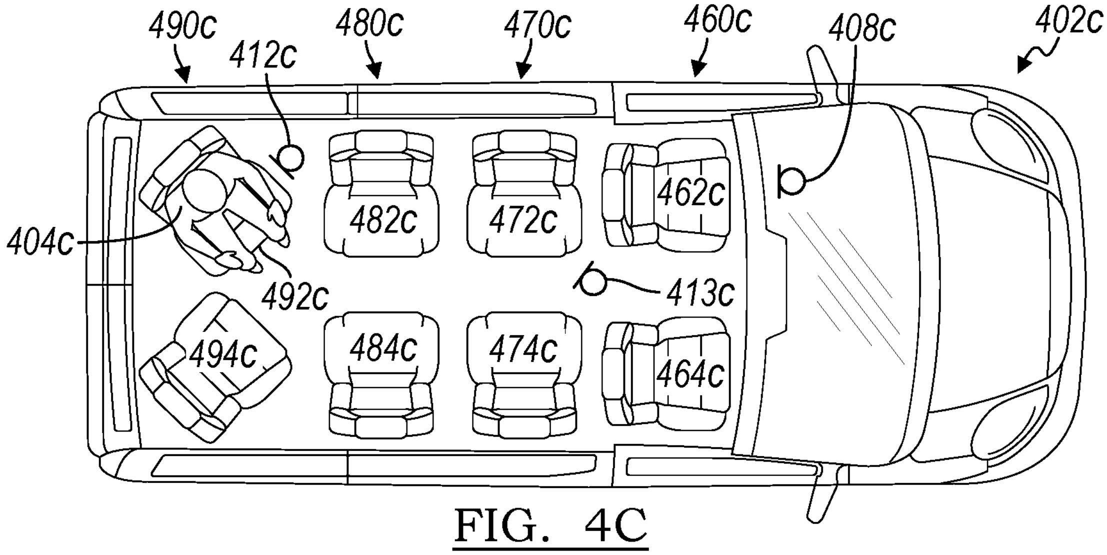
FIG. 4C is another top view of the vehicle of FIG. 1, illustrating a third vehicle occupancy configuration.

With reference to FIGS. 4-4C, a vehicle may allow for multiple different vehicle occupancy configurations, making it difficult for an ANC system to determine the location of the vehicle passengers' ears. FIG. 4A illustrates a vehicle 402*a* having six seats that are arranged in three rows and all face forward. The vehicle 402*a* includes two occupants: an operator 404*a* and a passenger 406*a*; an error microphone 408*a*, a first remote microphone 412*a*, and a second remote microphone location 413*a*. The operator 404*a* is the primary operator of the vehicle 402*a*, e.g., an adult, and the passenger 406*a* is a secondary operator of the vehicle 402*a*, e.g., a child or non-owner. The first row 460*a* includes a left seat 462*a* in the conventional driver seat location, and a right seat 464*a* in the conventional front-passenger seat. The second row 470*a* includes a left seat 472*a* and a right seat 474*a*. The third row 480*a* includes a left seat 482*a* and a right seat 484*a*.

The ANC system 306 may determine, e.g., from the one or more occupancy signals, that the left seat 462*a* of the first row 460*a* and the right seat 484*a* of the third row 480*a* are occupied. The ANC system 306 may also identify the occupants, e.g., determine from the occupancy signal, that the left seat 462*a* of the first row 460*a* is occupied by the operator 404*a* and therefore prioritize the performance of the ANC system 306 and/or other audio systems, e.g., music playback, phone, synthesized engine noise, etc. at the location of the error microphone 408*a* over the performance at the first remote microphone 412*a* and the second remote microphone location 413*a*.

FIG. 4B illustrates a vehicle 402*b* having seven seats arranged in four rows and face multiple different directions. The first row 460*b* includes a left seat 462*b* and a right seat 464*b* that are both facing rearward. Such rearward facing front seats may be an option for autonomous or self-driving vehicles. The second row 470*b* includes a left seat 472*b* and a right seat 474*b* that are both facing forward. The third row 480*b* includes a left seat 482*b* and a right seat 484*b* that are both facing inward to a central portion of the vehicle 402*b*. The fourth row 490*b* includes one central seat 492*b* that is facing forward. In an embodiment, two or more remote microphones are located in the region near the location of each occupant's ears. For a six-seat vehicle this system would have twelve or more remote microphones. In an embodiment, six remote microphones are used in a seat, two at the locations of each of a short passenger, medium passenger and tall passenger's ears. In a typical embodiment, eight physical microphones are used to generate eight remote microphone signals. In an embodiment eight physical microphones are used to generate ten remote microphone signals. In an embodiment as many as one hundred or more remote microphone positions are included, which necessitates storage of many remote secondary paths and PathPV filters.

The ANC system 306 may determine, e.g., from the one or more occupancy signals, that the left seat 472*b* of the second row 470*b* and the right seat 484*b* of the third row 480*b* are occupied. The ANC system 306 may also identify the occupants, e.g., determine from the occupancy signal, that the right seat 484*b* of the third row 480*b* is occupied by the operator 404*b* who is facing inward and therefore prioritize the performance of the ANC system 306 and/or other audio systems, e.g., music playback, phone, synthesized engine noise, etc. at the first remote microphone location 412*b* over the performance at the error microphone 408*b* and the second remote microphone location 413*b*.

FIG. 4C illustrates a vehicle 402*c* having eight seats arranged in four rows and face multiple different directions. The first row 460*c* includes a left seat 462*c* and a right seat 464*c* that are both facing forward. The second row 470*c* includes a left seat 472*c* and a right seat 474*c* that are both facing inward to a central portion of the vehicle 402*c*. Similarly, the third row 480*c* includes a left seat 482*c* and a right seat 484*c* that are both facing inward to a central portion of the vehicle 402*c*. The fourth row 490*b* includes a left seat 492*c* and a right seat 494*c* that are both facing inward at an angle toward a central portion of the vehicle 402*c*. In an embodiment, it can be problematic to present a musical soundstage optimally for two seats in close proximity that are facing toward each other, because for one listener, right and left will be interchanged. In cases such as this, the priority is for one preferred occupant, and the listening experience for the second occupant will be of lower accuracy and quality.

The ANC system 306 may determine, e.g., from the one or more occupancy signals, that the left seat 492*c* of the fourth row 490*c* is occupied. The ANC system 306 may also identify the occupant, e.g., determine from the occupancy signal, that the left seat 492*c* of the fourth row 490*c* is occupied by the operator 404*c* who is facing inward at an angle and therefore prioritize the performance of the ANC system 306 and/or other audio systems, e.g., music playback, phone, synthesized engine noise, etc. at the first remote microphone location 412*c* over the error microphone location 408*c* and the second remote microphone location 413*c*.

An ANC system may include many loudspeakers that can radiate anti-noise to the passengers, but can only generate a limited number of anti-noise signals at a time due to system hardware or software limitations, such as digital signal processor (DSP) chip million instructions per second (MIPS) limitations and algorithm output channel limitations. Loudspeakers in close proximity to the front seat passengers may be more effective in radiating anti-noise to the front seat passengers, resulting in superior noise cancellation than would result if distal loudspeakers radiated anti-noise to the front seat passengers. In this occupancy case, more front seat loudspeakers can be employed to radiate anti-noise, and fewer loudspeakers located closer to empty rear seats can be used to radiate anti-noise.

Additionally, an ANC system may include many physical microphones mounted in the vehicle, however there may be limitations on the number of physical microphone channels that the system can use simultaneously due to ADC, or amplifier/algorithm/DSP chip MIPS limitations, or other design constraints. When only the front seat is occupied, additional microphones near the front seat passengers may be selected to output their noise signals e(n) into the noise cancellation algorithm, in place of one or more microphones closer to the unoccupied (rear) seats, in an effort to provide optimal noise cancellation for the occupied seats.

Similarly, though there may be many accelerometer (noise) reference channels, only a smaller number may be simultaneously employed by the noise cancellation system due to hardware input or MIPS limitations. When only the front seat is occupied, additional reference signals from the front portion of the vehicle may be used in place of one or more reference signals originating from the rear portion of the vehicle. In one or more embodiments, reference signals from sensors having the highest coherence with the physical microphones or remote microphones closest to the occupied seats are selected, irrespective of their proximity to the occupied seats.

Referring back to FIG. 1, the vehicle 102 includes an occupancy detector 114 that provides an occupancy signal (Occ) that indicates whether or not the front driver seat 124 is occupied, the identity of the occupant, and the orientation of the occupant. Although one occupancy detector 114 is illustrated in FIG. 1, the ANC system 106 may include one occupancy detector 114 for each seat, or other numbers of occupancy detectors. The occupancy detector 114 may include numerous sensors and/or techniques, such as a seat belt sensor, a seat sensor, a proximity sensor, load-cell, motion sensor, a camera with a machine vision system, a camera with facial recognition or infrared (IR) imaging functionality, a passive infrared (PIR) sensor, or IR or near-IR sensors to detect the heat signature. In one embodiment, the occupancy detector 114 may include a microphone or microphone array that is adapted to act as an occupancy sensor, and optionally coupled with an adaptive beamformer. The ANC system 106 may allow a user to manually enter occupancy information via a user interface, e.g., a button or touch-screen option.

The ANC system 106 may use a variety of methods including sensors, sensory arrays, sensor fusion, speech recognition to detect which vehicle seats are occupied, the identity of the occupants, and the orientation of the occupants. Then the ANC system 106 selects the optimal music settings, phone settings, synthesized engine noise settings, and noise cancellation tuning using a combination of physical microphones, remote microphones, accelerometer sensors, physical and remote secondary paths, transfer functions, tuning parameters, and loudspeakers for a given occupancy configuration. In one embodiment, the ANC system 106 includes a camera (not shown), or other equipment to determine the remote microphone locations using a head tracking technique to determine the location of an occupant's ear canal openings.

An ANC system may achieve optimal performance when the location of each of the occupants' ears in 3-dimensional space is coincident with a remote microphone. An ANC system may achieve improved performance over a traditional, non-remote microphone technique when the location of the remote microphone is closer to the ear positions than are the physical microphones. The ANC system determines which seats are occupied, based on the occupancy signal from the occupancy detector 114, and then then the occupancy controller 552 selects the appropriate set of proximal remote and physical microphones, virtual and physical secondary paths, and PathPV for the ANC system from preconfigured data optionally stored in local storage 134. Other techniques for the selection of the remote microphone locations include the use of seat position encoders. An ANC system may use the data of the current seat position to estimate the location of the seat occupant's ears in three dimensions to select the closest remote microphone location to the occupant's ears, e.g., by selecting a low remote microphone location for a forward seat position, and a high remote microphone location for a rearward seat position. The remote microphone locations may be predetermined by the ANC system tuning engineers at the time of ANC system tuning, and so the selection of remote microphone locations involve determining which remote microphones are closest to the ear locations in 3-dimensional space.

Figure 5:
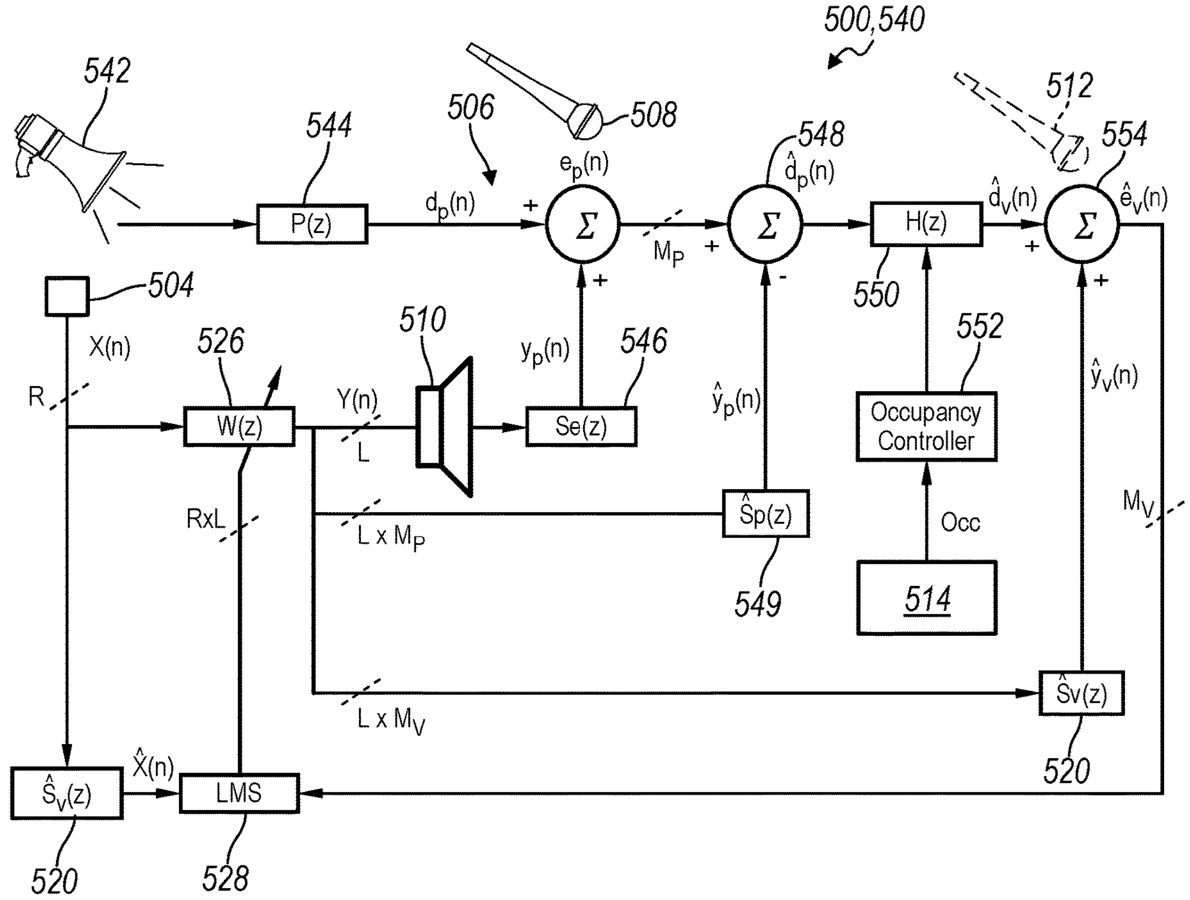
FIG. 5 is a schematic block diagram representing a remote microphone ANC system including an occupancy controller, in accordance with one or more embodiments.

FIG. 5 is a schematic block diagram of a vehicle-based remote microphone (RM) ANC system 506 showing many of the key ANC system parameters that may be used to estimate remote microphone error signals based on vehicle occupancy to optimize ANC system performance. For ease of explanation, the RM ANC system 506 illustrated in FIG. 5 is shown with components and features of an RNC system 500 and an EOC system 540. Accordingly, the RM ANC system 506 is a schematic representation of an RNC and/or EOC system, such as those described in connection with FIGS. 1-4, featuring additional system components of the RM ANC system 506 including a remote microphone 512 and an occupancy detector 514. Similar components may be numbered using a similar convention. For instance, similar to ANC system 106, the ANC system 506 may include a vibration sensor 504, a physical microphone 508, a w-filter 526, an adaptive filter controller 528, a remote secondary path filter 520, and a loudspeaker 510, consistent with operation of the vibration sensor 104, the physical microphone 108, the w-filter 126, the adaptive filter controller 128, the secondary path filter 120, and the loudspeaker 110, respectively, discussed above. FIG. 5 also shows the primary path P(z) and secondary path S(z), as described with respect to FIG. 1, in block form for illustrative purposes.

The physical microphone 508 provides an error signal $e_p(n)$ that includes all the sound present at its location, such as the disturbance signal $d_p(n)$ intended to be cancelled, which includes road noise, engine and exhaust noise, plus the anti-noise from the loudspeaker 510, $y_p(n)$, and any extraneous sounds at the microphone location.

The remote microphone 512 represents a microphone located at a remote microphone location that would similarly sense all the sound at its location, such as the disturbance signal $d_v(n)$ to be cancelled, which includes road noise, engine, and exhaust noise, plus the anti-noise from the loudspeaker 510 $y_v(n)$, and extraneous sounds. Typically, there are multiple physical microphone locations, and multiple remote microphone locations. Note that when operating the noise cancellation system, there is no actual microphone mounted at the location of the remote microphone. So, with the remote microphone technique, the pressure at the remote microphone locations is estimated from the pressure at the physical microphone locations to form an estimated error signal $\hat{e}_v(n)$.

The physical microphone 508 senses both the noise at its location $d_p(n)$ from a noise source 542 after traveling along a primary path P(z) 544 and the anti-noise at its location $y_p(n)$ from the loudspeaker 510 after traveling along a secondary path Se(z) 546. The physical microphone 508 provides a physical error signal $e_p(n)$, as shown by Equation 1:

$$e_p(n)=d_p(n)+y_p(n) \tag{1}$$

The RM ANC system 506 estimates the disturbance noise to be cancelled $\hat{d}_p(n)$ at the physical microphone location at block 548. The RM ANC system 506 subtracts an estimate of the anti-noise at the physical microphone location $\hat{y}_p(n)$ from the physical error signal $e_p(n)$ to estimate the disturbance noise at the physical microphone location $\hat{d}_p(n)$, as shown by Equation 2:

$$\hat{d}_p(n)=e_p(n)-\hat{y}_p(n) \tag{2}$$

The RM ANC system 506 then estimates the disturbance noise to be cancelled at the remote microphone location $\hat{d}_v(n)$ at microphone transfer function 550 by convolving the estimated disturbance noise at the physical microphone location $\hat{d}_p(n)$ with the transfer function between the physical and remote microphone location H(z). Although the terms virtual microphone and remote microphone can be used somewhat interchangeably, the technical difference between these two lies solely in the value of the transfer function H(z), which is sometimes termed PathPV. In the virtual microphone system, the value of H(z) is an identity matrix, which effectively bypasses this mathematical step. That is, the virtual microphone system does not account for the difference in disturbance noise to be cancelled between the physical and virtual microphone locations, but it does account for the difference in the antinoise present at the physical and virtual microphone locations. As outlined in the mathematical steps and diagrams above, the remote microphone system accounts for the difference in both the primary noise and secondary antinoise between the locations of the primary and remote microphones. The RM ANC system 506 includes an occupancy controller 552 that receives the occupancy signals (Occ) from the occupancy detectors 514 and adjusts tuning parameters, such as: H-filters, secondary paths, primary error signals, remote error signals, loudspeaker noise signals, and reference noise signals, based on the current occupancy configuration of the vehicle. For example, a gain can be added to a physical or remote error signal located near an occupied seat, relative to a physical or remote error signal from near an unoccupied seat. Similarly, the RM ANC system 506 may add attenuation to a physical or remote error signal near an unoccupied seat or seats. This will lead the LMS adaptive filter controller 528 to adapt the W-filters 526 to increase the noise cancellation in the region of the vehicle interior near the occupied seat.

At block 554, the RM ANC system 506 estimates the remote microphone error signal $\hat{e}_v(n)$ that would be present at the remote microphone by adding the estimated disturbance noise to be cancelled at the remote microphone location $\hat{d}_v(n)$ with an estimate of the anti-noise at this location $\hat{y}_v(n)$ as shown by Equation 3:

$$\hat{e}_v(n)=\hat{d}_v(n)+\hat{y}_v(n) \tag{3}$$

Combining Equations 1, 2 and 3 creates an estimate of the remote error microphone signal from the physical error signal, the physical and remote microphone secondary path and the transfer function between the physical and remote locations.

Similar to FIG. 1, the noise signal X(n) from the noise input, such as vibration sensor 504, may be filtered with a modeled transfer characteristic $\hat{S}(z)$, using stored estimates of the remote secondary path as previously described, by the remote secondary path filter 520 to obtain a filtered noise signal $\hat{X}(z)$. Moreover, a transfer characteristic W(z) of the controllable filter 526 (e.g., a W-filter) may be controlled by the LMS adaptive filter controller (or simply LMS controller) 528 to provide an adaptive filter. The LMS adaptive filter controller 528 receives the filtered noise signal $\hat{X}(z)$ and the estimated remote error signal $\hat{e}_v(n)$ to adapt the W-filters to produce optimized noise cancellation at the location of the remote microphone. The controllable filter 526 generates the anti-noise signal Y(n) based on the output of the LMS adaptive filter controller 528 and the noise signal X(n).

Similar to FIG. 2, the RM ANC system 506 is scaled to include R accelerometer signals, L loudspeaker or loudspeaker signals, and M microphone error signals. Accordingly, the RM ANC system 506 may include R*L controllable filters (or W-filters) 526 and L*M anti-noise signals.

Figure 6:
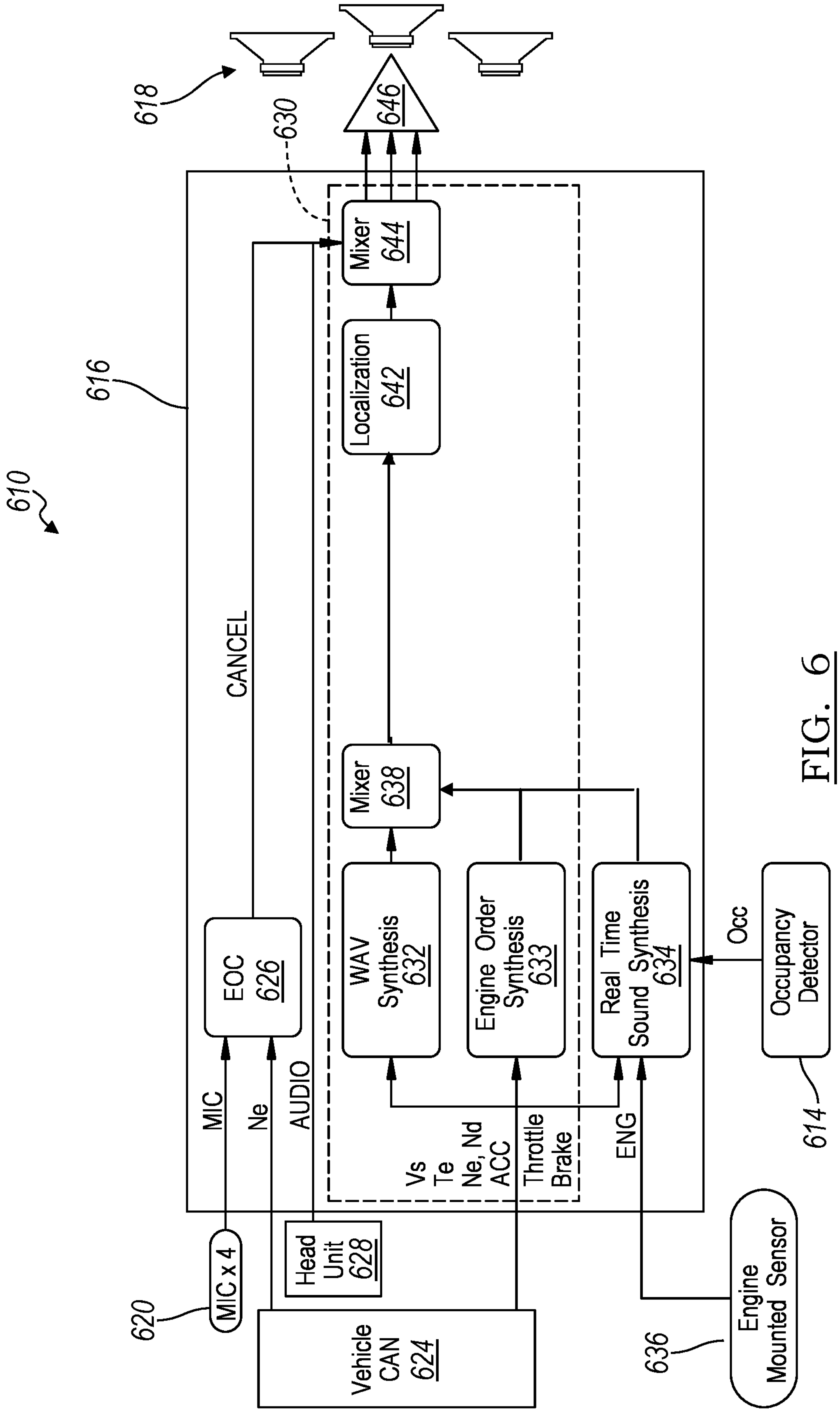
FIG. 6 is a schematic block diagram representing an audio system with a remote microphone ANC system, a music system, and synthesized engine sound system.

With reference to FIG. 6, a vehicle audio system is illustrated in accordance with one or more embodiments and generally represented by numeral 610. The vehicle audio system 610 is included in a vehicle, such as the vehicle 102 shown in FIG. 1. The vehicle 102 includes a powertrain (not shown), which may include an internal combustion engine (ICE). The vehicle audio system 610 includes an occupancy detector 614, a controller 616, at least one loudspeaker 618, and in certain embodiments, at least one microphone 620. In certain embodiments, the loudspeaker 618 is mounted directly to a seat, or in seat. In certain embodiments, the loudspeaker 618 is mounted to a seat, and a second loudspeaker is mounted to a door or other stationary, non-moving object or surface. In certain embodiments, several loudspeakers are mounted to several seats.

The occupancy detector 614 provides an occupancy signal (Occ) that indicates whether or not a corresponding seat is occupied, the identity of the occupant, and the orientation of the occupant. The vehicle audio system 610 may include one occupancy detector 614 for each seat, or other numbers of occupancy detectors. The occupancy detector 614 may include numerous sensors and/or techniques, such as a seat belt sensor, a seat sensor, a proximity sensor, load-cell, motion sensor, a camera with a machine vision system, a camera with facial recognition or infrared (IR) imaging functionality, a passive infrared (PIR) sensor, or IR or near-IR sensors to detect the heat signature. In one embodiment, the occupancy detector 614 may include a microphone or microphone array that is adapted to act as an occupancy sensor, and optionally coupled with an adaptive beamformer. The vehicle audio system 610 may allow a user to manually enter occupancy information via a user interface, e.g., a button or touch-screen option.

A driver may expect to hear noise from the powertrain within a passenger cabin of the vehicle 102 during certain driving modes or maneuvers. Such powertrain noise may be reduced or absent in new vehicle architectures, such as electric vehicles, and driving modes, such as electric propulsion mode of a plug-in hybrid electric vehicle. The controller 616 communicates with one or more vehicle controllers (not shown) to monitor various vehicle components and systems, such as the powertrain, under current driving conditions. The controller 616 generates a synthesized engine noise (SEN) signal that aides the driving experience by providing audible feedback of the vehicle's driving dynamics (e.g., acceleration, cruising, deceleration, reverse, startup, shutdown), which is provided to the loudspeaker 618 and projected as audio that is audible within the passenger cabin. This SEN combines with the actual engine sound to produce the total engine sound heard by the driver. This total engine sound combines with other sounds in the passenger cabin to form the soundscape experienced by the driver. The SEN term as used herein may refer to audible airborne sound, and to an electrical signal that is sent to an amplifier and then to a loudspeaker to become the audible sound.

The controller 616 communicates with other vehicle systems and controllers via one or more vehicle networks by wired or wireless communication. The vehicle network may include a plurality of channels for communication. One channel of the vehicle network may be a serial bus such as a Controller Area Network (CAN) 624. One of the channels of the vehicle network may include an Ethernet network defined by Institute of Electrical and Electronics Engineers (IEEE) 802 family of standards. Additional channels of the vehicle network may include discrete connections between modules and may include power signals. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules and controllers.

Although the controller 616 is shown as a single controller, it may contain multiple controllers, or it may be embodied as software code within one or more other controllers. The controller 616 generally includes any number of microprocessors, ASICs, ICs, memory (e.g., FLASH, ROM, RAM, EPROM and/or EEPROM) and software code to co-act with one another to perform a series of operations. The controller 616 includes predetermined data, or "look up tables" that are stored within the memory, according to one or more embodiments.

The controller 616 includes an Engine Order Cancellation (EOC) module 626 according to one or more embodiments. The EOC module 626 cancels, reduces, or masks the actual engine sound. The controller 616 receives a microphone signal, or signals, (MIC) that represents sound measured by one or more microphones 620 within the passenger cabin. In one or more embodiments, the vehicle 102 includes at least four microphones 620 that are mounted at different locations within the passenger cabin, and the controller 616 receives four corresponding MIC signals. The at least four microphones 620 may include error microphones and/or remote microphones. The controller 616 also receives signals that represent the rotational speed of the engine (Ne) and the rotational speed of the drive shaft (Nd). Using these signals (MIC, and Ne or Nd), the EOC module 626 generates a signal (CANCEL) to cancel or reduce specific engine orders, as perceived at specific remote microphone locations within the passenger cabin, e.g., near the ears of the driver, based on the occupancy signal from the occupancy detector 614.

The vehicle audio system 610 includes the controller 616, the loudspeaker(s) 618, and a head unit 628. The controller 616 receives audio signals (AUDIO) from the head unit 628. Like the controller 616, the head unit 628 generally includes any number of microprocessors, ASICs, ICs, memory (e.g., FLASH, ROM, RAM, EPROM and/or EEPROM) and software code to co-act with other controllers to perform a series of operations. A music playback system incorporated in the head unit 628 includes per-speaker equalization that may be applied in the head unit, in the mixer 644 or in the amplifier 646. The equalization of the music playback system is made more complex by the way the original two distinct channels (right and left) of the audio signal must become multiple signals to drive each of the multiple loudspeakers 618 in the playback system in modern vehicles. The output from all of these loudspeakers is audible to occupants seated in every seat, and the goal of the equalization is to provide an immersive listening experience, which includes reproducing a stereophonic sound stage, accurately rendering sounds on the right, left, and center (and perhaps behind) each listener. The controller 616 includes a SEN module 630 for generating synthetic engine sound or noise. The SEN module 630 receives numerous guiding signals from the CAN bus 624, such as vehicle speed (VS), engine torque (Te), engine speed (Ne), and throttle (THROTTLE) position. In one or more embodiments, the SEN module 630 also receives signals that represent: accelerator pedal position (ACC), brake pedal position (BRAKE), and cruise control (CRUISE). The controller 616 receives multiple guiding signals, however alternate embodiments of the controller 616 receive fewer, alternate and/or additional guiding signals.

In one or more embodiments, the SEN module 630 includes a WAV Synthesis block 632 that plays back a filtered, modified, or augmented audio bitstream that is generated from a Waveform (WAV) Audio File and represents synthetic engine sound or synthetic engine noise. In one or more embodiments, the WAV Synthesis block 632 generates the audio bitstream. The WAV Synthesis block 632 also includes features for modulating the characteristics of the audio bitstream, e.g., playback rate, frequency dependent filtering, and/or amplitude. In one or more embodiments, the SEN module 630 also includes an Engine Order Synthesis block 633 that generates an engine order signal based on, for example, engine order frequencies and levels found in lookup tables for the engine speed or vehicle speed.

The controller 616 also includes a Real Time Sound Synthesis Module 634 according to one or more embodiments. The Real Time Sound Synthesis Module 634 receives an engine signal (ENG) that represents the current vibroacoustic emissions of the engine. The ENG signal may be derived from a pressure or vibration sensor 636 that is mounted in proximity to the engine and/or emissions system. In an embodiment, the Real Time Sound Synthesis Module 634 processes the ENG signal into individual engine orders that may then be individually filtered, equalized and then provided to a Mixer block 638 to be combined with the output of the WAV Synthesis block 632 and the Engine Order Synthesis block 633. In an alternate embodiment, the ENG signal may be filtered and provided to the Mixer block 638 to create the desired real time SEN characteristics.

In one or more embodiments, the SEN module 630 includes a Localization block 642 that receives the audio signal from the Mixer block 638 and generates a sound image of where the engine would typically be located relative to the loudspeaker 618. For example, in one or more embodiments, the Localization block 642 generates a sound image for the SEN that corresponds to a remote location three to four feet forward of a loudspeaker 618 located in a headrest of a driver seat. Localization block 642 applied electrical equalization for SEN signals sent to some or all the loudspeakers in the vehicle. In an embodiment, localization block 642 receives input from occupancy controller 552, which aides in selecting the appropriate equalization for the current configuration of passengers, or for the current location of the most important passenger.

The SEN module 630 includes a Mixer 644 for combining the localized SEN output of the Localization block 642, with the CANCEL and AUDIO signals. The controller 616 provides the SEN signal(s) to one or more power amplifiers 646, which in turn provides amplified SEN signals to the loudspeakers 618. The vehicle audio system 610 amplifies and plays through the vehicle loudspeakers 618 to provide the vehicle occupants, especially the driver, real time audible feedback of the vehicle's operating state.

The original engine sound that is present at the locations of the passengers' ears, as measured by the remote microphones 620, may be effectively cancelled or reduced using an EOC module 626, enabling the character of the original engine sound to be replaced by that of the SEN played through loudspeakers 618. That is by first dramatically reducing the level of the actual engine noise at the locations of the passengers' ears using the EOC module 626, the controller 616 lowers the overall sound pressure level, including the contribution of the SEN, at the location of the passenger's ears. It is often desirable to achieve the lowest overall engine sound pressure level at the location of the listener's ears that has the desired sonic characteristics.

The vehicle audio system 610 is applicable to vehicles 612 having different powertrains. In one or more embodiments, the vehicle 102 is a conventional vehicle with a powertrain that includes a four-cylinder internal combustion engine. Such four-cylinder engines naturally radiate certain engine orders—mainly the 2nd, 4th, 6th, and 8th orders of the engine output shaft rotational speed. The vehicle audio system 610 synthesizes additional engine orders: 2.5, 4.5, and 6.5 engine orders, e.g., using the Engine Order Synthesis block 633, to add a racier character to the engine's sound signature.

In another embodiment, the vehicle 102 is an auto-start stop vehicle with a powertrain that includes an engine that is controlled to stop or shut-off when the vehicle stops for a short period of time, e.g., at a traffic light, and then restart to provide propulsion. This start/stop technology is employed to increase fuel efficiency. In various embodiments, the vehicle audio system 610 generates SEN to remove or mask the abrupt audible transition when the engine turns off or restarts using various combinations of the Engine Order Synthesis block 633 and the WAV Synthesis block 632.

In yet another embodiment, the vehicle 102 is a hybrid electric vehicle (HEV) with a powertrain that includes an engine and an electric motor that be controlled, alone or in combination, to propel the vehicle. The vehicle audio system 610 generates SEN, using the SEN module 630, when the HEV 102 is operating in electric mode, i.e., the electric motor alone is operated for propulsion in order to provide the audible engine sound signature of a gasoline powered engine that the driver and vehicle occupants may be more accustomed to. This added sound aides the driving experience by providing audible feedback of the vehicles driving dynamics (acceleration, cruising, and deceleration, reverse, startup, shutdown, etc.). Fully electric vehicles, and HEVs operating in EV mode, have an internal soundscape that consists primarily of vehicle suspension noise, vibration and harness (NVH) and electric motor whine, the latter of which is harmonically sparse. Often the sound signature of motor whine is viewed as undesirable, due both to its high frequency nature, and the lack of harmonic complexity. Naturally other sounds are present in the passenger cabin.

In other embodiments, the vehicle audio system 610 replaces the audible character of the engine by an entirely different sound signature. In this case, the vehicle audio system 610 reduces the audible level of the engine and/or electric motor using the EOC module 626. This EOC module 626 reduces the overall level of individual engine orders, and therefore reduces the total level of engine noise in the passenger cabin at the locations of the vehicle occupants. Then, a SEN may be played through the loudspeakers 618, and the original sound at the locations of the passengers' ears may be effectively replaced, or masked, by that of the SEN. By first dramatically reducing the level of the actual engine noise at the locations of the passengers' ears, the overall sound pressure level including the contribution of the SEN at the location of the passenger's ears is lower than it otherwise would be without employing the EOC system. It is often desirable to achieve the lowest overall engine sound pressure level at the location of the listener's ears that has the desired sonic characteristics.

In an EV or HEV, the driver may not receive audible feedback after starting the vehicle, if the vehicle starts without any traditional engine sound. In this type of vehicle, the vehicle audio system 610 synthesizes engine-like sounds, i.e., SEN, and plays it through the loudspeakers 618 to provide a more traditional engine start up vehicle experience. The SEN may be of any sonic character, and need not mimic an engine. In one or more embodiments, the SEN resembles sounds that are not typical of an automotive engine, e.g., a jet engine for an aircraft. This SEN may start when the vehicle's power button (not shown) is pressed, and helps provide an audible feedback to the driver that the vehicle is powered on. This SEN continues to be played through the loudspeakers 618 to give the driver audible feedback as to the state of the vehicle—whether at idle, accelerating, decelerating, or just cruising.

As previously mentioned, SEN generation systems coupled with EOC systems have the capability to mask existing engine sound with more desirable synthesized engine-like sounds and or to enhance existing engine sounds to play in the passenger cabin of the vehicle 102. Most of the synthesized engine sounds in these systems are tuned using one or more reference CAN signals such as vehicle speed (VS), throttle (or ACC), engine torque (Te), in order to naturally integrate these sounds into the vehicle. The synthesized engine sound is played at a level that is somewhat subtle, it should not be played so loud that it annoys or fatigues occupants of the vehicle. In some cases, the interior sound pressure level of the passenger cabin is a metric of quality: quieter cabins may be a sign of a luxury vehicle.

Often, a goal of creating SEN is to provide the vehicle's driver a form of audible feedback of the vehicle's current operating state. It is often important for the SEN to be of relatively high amplitude for a short duration to signal a change in vehicle operating state and then for the SEN level to be reduced so as not to fatigue the vehicle occupants. For example, with hybrid vehicles operating in electric mode, or with pure electric vehicles, there is no engine idle sound. That is, the powertrain of the vehicle is completely silent when the wheels are not turning. The driver, therefore, has no audible indication that the vehicle is powered on, even if the transmission is in drive and not park. In the case of vehicle acceleration, the vehicle's driver is accustomed to the amplitude of the engine noise increasing as the vehicle speed increases, as is the behavior of an ICE. To mimic this behavior with SEN, the accelerator pedal position (ACC) and the engine torque (Te) are used, by the WAV Synthesis block 632 and the Engine Order Synthesis block 633, as guiding signals to increase the amplitude of the synthetic engine sound. Drivers are also accustomed to the pitch of the engine orders increasing as the vehicle speed increases, as is also the behavior of an ICE. To mimic this behavior, the engine shaft rotational speed (Ne), wheel speed, or vehicle speed (Vs) is used as a guiding signal to the WAV Synthesis block 632 of the SEN module 630 to adjust the pitch of the synthetic engine orders or SEN.

Figure 7:
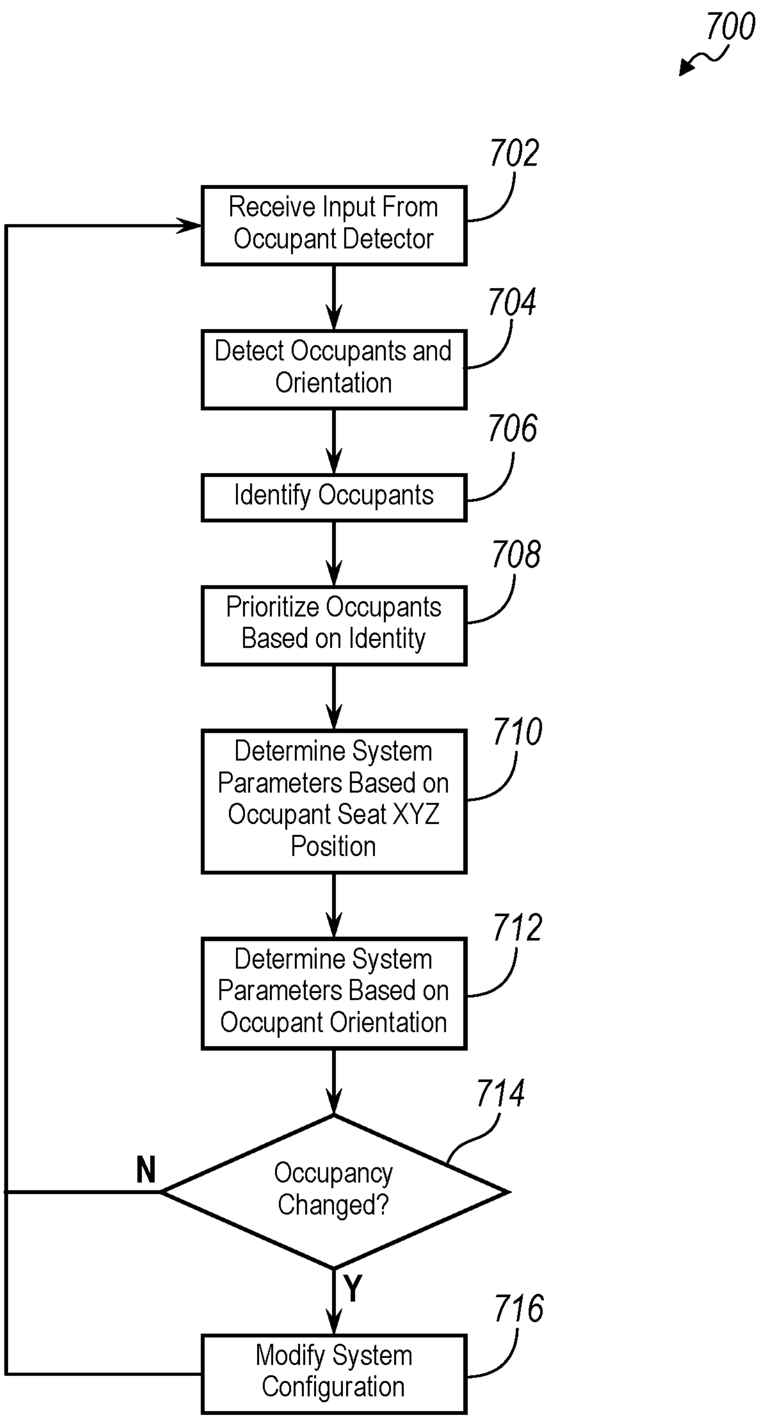
FIG. 7 is a flowchart depicting a method for adjusting remote microphone parameters based on vehicle occupancy and identification, in accordance with one or more embodiments.

FIG. 7 is a flowchart depicting a method 700 for adjusting remote microphone system parameters based on vehicle occupancy, in accordance with one or more embodiments of the present disclosure. Various steps of the disclosed method may be carried out by the adaptive filter controller 528, controller 616, controller 552, or processor 132, either alone, or in combination with other components of the RM ANC system 506 or vehicle audio system 610.

At step 702, the RM ANC system 506 and the controller 616, each receive input from vehicle sensors, e.g., the occupancy detectors 514, 614. Then at step 704 the occupancy controller 552 and the controller 616, each determine where the occupants are located within the vehicle, e.g., which seat(s) are occupied. The occupancy controller 552 and the controller 616 also determine the orientation of each occupant, e.g., which direction they are facing in the vehicle at step 704, according to one or more embodiments. At step 706, the occupancy controller 552 and the controller 616 each identify each occupant, e.g., using facial recognition software. For example, the occupancy controller 552 and the controller 616 may identify an operator 404 and/or a passenger 406 of the vehicle.

At step 708, both the occupancy controller 552 and the controller 616 prioritize the occupants, e.g., the occupancy controller 552 and the controller 616 may prioritize an operator 404 of the vehicle over a passenger 406, child, or unknown occupant of the vehicle.

At step 710, both the occupancy controller 552 and the controller 616 determine system parameters based on the 3-dimensional (XYZ) location of the occupied seats. In an embodiment, sets of predetermined parameters for each vehicle system for multiple vehicle configurations may be stored in local storage 134, controller 552, controller 616, or other memory accessible to these or other controllers. At step 712, both the occupancy controller 552 and the controller 616 determine system parameters based on the orientation of each occupant.

At step 714, both the RM ANC system 506 and the controller 616 compare the occupancy configuration and identification to the last saved occupancy configuration, to determine if the occupancy configuration has changed. If the configuration has not changed, both the RM ANC system 506 and the controller 616 return to step 702. If the configuration has changed, both the RM ANC system 506 and the controller 616 proceed to step 716 and adjust one or more system parameters.

At step 716, the RM ANC system 506 adjusts the anti-noise signal Y(n) provided to one or more loudspeakers 510 based on the current occupancy configuration. The occupancy controller 552 may include predetermined stored data that is indicative of optimum transfer function parameters, such as H-filters, for each occupancy configuration based on hardware and software limitations of the system 506. The transfer function may include one or more remote microphone transfer functions H(z) 550, one or more physical microphone transfer functions, or a combination of both remote and physical microphone transfer functions. In one embodiment, a set of remote microphones, physical microphones, loudspeakers, noise signals, remote secondary paths, physical secondary paths, physical or remote microphone gains, accelerometer gains, other LMS system tuning parameters, and H(z) transfer functions is stored in a database for each occupancy configuration, and the RM ANC system 506 selects the complete set of parameters from the database at step 716. In another embodiment, the database stores only a subset of the aforementioned RM ANC system parameters.

Many of the parameters in the RM ANC system 506 are linked together and therefore the RM ANC system 506 may change multiple parameters in tandem at step 716. In one embodiment, if the RM ANC system 506 modifies the configuration of remote microphones 512, then it also modifies the remote secondary path $\hat{S}(z)$ 520 and the microphone transfer function H(z) 550 based on the modified configuration. In another embodiment, if the RM ANC system 506 modifies the configuration of the physical microphones 508, then it also modifies the physical secondary path $\hat{S}(z)$ 549 and the microphone transfer function H(z) 550 based on the modified configuration. In another embodiment, the RM ANC system 506 uses multiple copies of the same physical error signal $e_p(n)$ in place of certain 'deactivated' error signals. In another embodiment, if the RM ANC system 506 modifies the configuration of the loudspeakers 510, then it also modifies the physical secondary path $\hat{S}(z)$ 549 and the remote secondary path $\hat{S}(z)$ 520 based on the modified configuration. In an embodiment, at the RM ANC system 506 modifies the configuration of the noise signals X(n), then it also resets or modifies the W-filters 526 based on the modified configuration.

In one or more embodiments, when the vehicle is in a less than fully occupied configuration, the RM ANC system 506 selects more remote microphones near the occupied seats in order to improve the noise cancellation in the occupied seats in part by not overly constraining the system to provide noise cancellation in unoccupied regions of the vehicle. In an embodiment more than one remote microphone location around each seat's headrest is chosen, and the relevant transfer functions, $\hat{S}(z)$ and H(z) are stored for each loudspeaker and physical microphone in the system. In an embodiment with only one occupant, all eight remote microphone $e'_v(n)$ signals input into the LMS adaptive filter controller 528 are in close proximity to the driver, at positions surrounding the occupant's head.

With reference to the vehicle audio system 610, at step 716, the controller 616 adjusts the SEN signal and/or music signal provided to one or more loudspeakers 618 based on the current occupancy configuration. The controller 616 may include predetermined stored data that is indicative of optimum per-speaker equalization parameters, such as loudspeaker to ear transfer functions or equalization curves, for each occupancy configuration based on hardware and software limitations of the vehicle audio system 610. In one embodiment, a set of per-speaker EQ's for music playback and a separate set of per-speaker EQ's for SEN sound playback SEN and music is stored in a database for each occupancy configuration, and the controller 616 selects the complete set of parameters from the database at step 716. In another embodiment, the database stores only a subset of the aforementioned RM ANC, SEN, or music system parameters.

Although the ANC system is described with reference to a vehicle, the techniques described herein are applicable to non-vehicle applications. For example, a room may have fixed seats which define a listening position at which to quiet a disturbing sound using reference sensors, error sensors, loudspeakers and an LMS adaptive system. Note that the disturbance noise to be cancelled is likely of a different type, such as HVAC noise, or noise from adjacent rooms or spaces. Further, a room may have occupants whose position varies with time, and the seat sensors or head tracking techniques described herein must then be relied upon to determine the position of the listener or listeners so that the 3-dimensional location of the remote microphones can be selected.

Although FIGS. 1, 3, and 5 show LMS-based adaptive filter controllers 128, 328, and 528, respectively, other methods and devices to adapt or create optimal controllable W-filters 126, 326, and 526 are possible. For example, in one or more embodiments, neural networks may be employed to create and optimize W-filters in place of the LMS adaptive filter controllers. In other embodiments, machine learning or artificial intelligence may be used to create optimal W-filters in place of the LMS adaptive filter controllers.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof.

For example, the steps recited in any method or process claims may be executed in any order and are not limited to the specific order presented in the claims. Equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Further, functionally equivalent processing steps can be undertaken in either the time or frequency domain. Accordingly, though not explicitly stated for each signal processing block in the figures, the signal processing may occur in either the time domain, the frequency domain, or a combination thereof. Moreover, though various processing steps are explained in the typical terms of digital signal processing, equivalent steps may be performed using analog signal processing without departing from the scope of the present disclosure Benefits, advantages and solutions to problems have been described above with regard to particular embodiments. However, any benefit, advantage, solution to problems or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments.

What is claimed is:

1. A vehicle audio system comprising:

at least one loudspeaker to project sound within a room in response to receiving an audio signal; and a controller programmed to:

perform an occupant identification for a first occupant at a first location and a second occupant at a second location within the room, generate the audio signal based on at least one occupancy signal indicative of occupant presence and the occupant identification within the room, wherein the audio signal is indicative of at least one of anti-noise sound, synthesized engine noise (SEN), and music, and prioritize the audio signal to the first occupant.

2. The vehicle audio system of claim 1, further comprising:

at least one microphone to provide an error signal indicative of noise and anti-noise sound within the room;

wherein the occupant identification is based on facial recognition, and the controller is further programmed to:

modify a transfer function between the at least one microphone and at least one remote microphone location based on the at least one occupancy signal;

filter the error signal using the transfer function to obtain an estimated remote microphone error signal; and generate the audio signal based on the estimated remote microphone error signal, wherein the audio signal comprises an anti-noise signal.

3. The vehicle audio system of claim 2, wherein the at least one remote microphone location comprises a first remote microphone location and a second remote microphone location spaced apart from the first remote microphone location; and wherein the controller is further programmed to modify the transfer function by increasing a gain associated with the first remote microphone location in response to the first occupant being proximate to the first remote microphone location.

4. The vehicle audio system of claim 2, wherein the at least one microphone comprises at least two microphones, and wherein the controller is further programmed to:

select one of the at least two microphones based on the at least one occupancy signal; and filter the error signal from the selected microphone using the transfer function to obtain the estimated remote microphone error signal.

5. The vehicle audio system of claim 2, wherein the at least one loudspeaker comprises at least two loudspeakers, and wherein the controller is further programmed to:

select one of the at least two loudspeakers based on the at least one occupancy signal; and generate the anti-noise signal to be radiated from the selected loudspeaker within the room based on the estimated remote microphone error signal.

6. The vehicle audio system of claim 2, wherein the controller is further programmed to determine a location of the at least one remote microphone using at least one of a head tracking technique and a seat position.

7. The vehicle audio system of claim 2, further comprising:

at least one sensor to provide a non-acoustic noise signal;

a second secondary path filter to filter the non-acoustic noise signal to obtain a filtered noise signal, the second secondary path filter defined by a stored transfer characteristic that estimates a secondary path between the loudspeaker and the microphone; and wherein the controller is further programmed to filter the error signal based on the filtered noise signal and the estimated remote microphone error signal.

8. The vehicle audio system of claim 7, wherein the at least one sensor comprises at least two sensors, and wherein the controller is further programmed to:

select one of the at least two sensors based on a coherence of the sensor with at least one of the at least one microphone and the at least one remote microphone location.

9. The vehicle audio system of claim 1, wherein the audio signal is indicative of SEN, and wherein the controller is further programmed to generate the audio signal based on an estimated remote microphone error signal, and at least one of a gear selection, an engine speed, and a pedal position; and wherein the at least one loudspeaker is adapted to project SEN in response to receiving the audio signal.

10. A method for controlling an audio system, the method comprising:

generating an audio signal to be radiated from a loudspeaker within a vehicle based on at least one occupancy signal indicative of occupant presence and occupant identification within the vehicle, wherein the audio signal is indicative of at least one of anti-noise sound, synthesized engine noise (SEN), and music; and adjusting the audio signal based on priorities of a plurality of occupants indicated in the occupant identification.

11. The method of claim 10, further comprising:

receiving an error signal from a microphone indicative of noise and anti-noise within the vehicle;

receiving the at least one occupancy signal from an occupancy detector;

modifying a transfer function between the microphone and a remote microphone location based on the at least one occupancy signal;

filtering the error signal using the transfer function to obtain an estimated remote microphone error signal; and wherein the audio signal comprises generating an anti-noise signal to be radiated from the loudspeaker within the vehicle based on the estimated remote microphone error signal.

12. The method of claim 11, wherein the remote microphone location comprises a first remote microphone location and a second remote microphone location spaced apart from the first remote microphone location, and wherein modifying the transfer function further comprises:

increasing a gain associated with the first remote microphone location in response to occupant presence proximate to the first remote microphone location.

13. The method of claim 11, wherein the microphone further comprises at least two microphones and the loudspeaker comprises at least two loudspeakers, and wherein the method further comprises:

selecting one of the at least two microphones based on the at least one occupancy signal;

selecting one of the at least two loudspeakers based on the at least one occupancy signal;

filtering the error signal from the selected microphone using a secondary path filter to obtain the estimated remote microphone error signal; and generating the anti-noise signal to be radiated from the selected loudspeaker within the vehicle based on the estimated remote microphone error signal.

14. The method of claim 11 further comprising:
determining a location of the remote microphone using at least one of a head tracking technique and a seat position.

15. An audio system comprising:
at least one loudspeaker to project sound within a room in response to receiving an audio signal;
at least one occupancy sensor to provide an occupancy signal indicative of occupant presence and occupant identification; and
a controller programmed to generate the audio signal based on the occupancy signal, wherein the audio signal is indicative of at least one of anti-noise sound, synthesized engine noise (SEN), and music.

16. The audio system of claim 15, wherein the controller is further programmed to:
modify a transfer function between at least one microphone and at least one remote microphone location based on the occupant presence and the occupant identification;
filter an error signal indicative of noise and anti-noise sound within the room using the transfer function to obtain an estimated remote microphone error signal; and
generate an anti-noise signal based on the estimated remote microphone error signal and to provide the anti-noise signal to the at least one loudspeaker to project anti-noise sound within the room.

17. The audio system of claim 16, wherein the controller is further programmed to modify the transfer function by increasing a gain associated with a first remote microphone location in response to an occupant being proximate to the first remote microphone location.

18. The audio system of claim 16 further comprising:
at least two microphones; and
wherein the controller is further programmed to:
select one of the at least two microphones based on the occupant presence and the occupant identification; and
filter the error signal from the selected microphone using a secondary path filter to obtain the estimated remote microphone error signal.

19. The audio system of claim 16 further comprising:
at least two loudspeakers; and
wherein the controller is further configured to:
select one of the at least two loudspeakers based on the occupant presence; and
generate the anti-noise signal to be radiated from the selected loudspeaker within the room based on the estimated remote microphone error signal.

20. The audio system of claim 15, further comprising:
at least two loudspeakers;
wherein the occupancy signal is further indicative of occupant orientation; and
wherein the controller is further programmed to generate at least two audio signals based on the occupant orientation to provide stereo sound to the occupant.

* * * * *